(12) United States Patent
Takaoka et al.

(10) Patent No.: US 8,509,046 B2
(45) Date of Patent: Aug. 13, 2013

(54) OPTICAL INFORMATION RECORDING METHOD, OPTICAL INFORMATION RECORDING DEVICE, OPTICAL INFORMATION REPRODUCTION METHOD, OPTICAL INFORMATION REPRODUCTION DEVICE, AND OPTICAL INFORMATION RECORDING MEDIUM

(75) Inventors: Tomoyasu Takaoka, Osaka (JP); Shigeru Furumiya, Hyogo (JP); Atsushi Nakamura, Osaka (JP)

(73) Assignee: Panasonic Corporation, Osaka (JP)

( * ) Notice: Subject to any disclaimer, the term of this patent is extended or adjusted under 35 U.S.C. 154(b) by 0 days.

(21) Appl. No.: 13/516,000

(22) PCT Filed: Dec. 16, 2010

(86) PCT No.: PCT/JP2010/007309
§ 371 (c)(1),
(2), (4) Date: Jun. 14, 2012

(87) PCT Pub. No.: WO2011/074267
PCT Pub. Date: Jun. 23, 2011

(65) Prior Publication Data
US 2012/0294135 A1   Nov. 22, 2012

(30) Foreign Application Priority Data

Dec. 18, 2009  (JP) .................................. 2009-287119

(51) Int. Cl.
*G11B 7/0045* (2006.01)
(52) U.S. Cl.
USPC ........................ 369/59.12; 369/94; 428/64.4
(58) Field of Classification Search
None
See application file for complete search history.

(56) References Cited

U.S. PATENT DOCUMENTS

| 7,298,682 | B2 | 11/2007 | Miura et al. |
| 7,760,596 | B2 | 7/2010 | Narumi et al. |
| 7,773,478 | B2 | 8/2010 | Hibino et al. |

(Continued)

FOREIGN PATENT DOCUMENTS

| JP | 2679596 | 11/1997 |
| JP | 2003-178448 | 6/2003 |

(Continued)

OTHER PUBLICATIONS

International Search Report issued Mar. 15, 2011 in International (PCT) Application No. PCT/JP2010/007309.

*Primary Examiner* — Wayne Young
*Assistant Examiner* — Brian Butcher
(74) *Attorney, Agent, or Firm* — Wenderoth, Lind & Ponack, L.L.P.

(57) ABSTRACT

A recording wavelength generator selects control parameters of a recording pulse sequence, based on combinations of mark length, a first space length of a first space immediately before the mark, and a second space length of a second space immediately after the mark. A laser drive circuit records the marks by the recording pulse sequence. The first and second space lengths are classified into m and n types, respectively. An absolute value of a difference between two predetermined control parameters from among (m×n) control parameters selected during recording on a second information layer located on an incidence side of the laser beam with respect to a predetermined first information layer from among N information layers is equal to or greater than an absolute value of a difference between two predetermined control parameters from among the (m×n) control parameters selected during recording on the first information layer.

15 Claims, 11 Drawing Sheets

(56) References Cited

U.S. PATENT DOCUMENTS

| | | |
|---|---|---|
| 7,813,239 B2 | 10/2010 | Narumi et al. |
| 7,821,892 B2 | 10/2010 | Narumi et al. |
| 7,881,173 B2 | 2/2011 | Narumi et al. |
| 8,040,770 B2 | 10/2011 | Wada |
| 2005/0163011 A1 | 7/2005 | Miura et al. |
| 2005/0174906 A1 | 8/2005 | Narumi et al. |
| 2007/0081445 A1 | 4/2007 | Hibino et al. |
| 2007/0159947 A1 | 7/2007 | Matsumoto |
| 2007/0165506 A1* | 7/2007 | Nakamura et al. ......... 369/59.11 |
| 2008/0043592 A1 | 2/2008 | Narumi et al. |
| 2009/0129225 A1 | 5/2009 | Narumi et al. |
| 2009/0141601 A1 | 6/2009 | Wada |
| 2010/0309767 A1 | 12/2010 | Narumi et al. |
| 2011/0090778 A1 | 4/2011 | Narumi et al. |

FOREIGN PATENT DOCUMENTS

| | | |
|---|---|---|
| JP | 2003-242644 | 8/2003 |
| JP | 2008-506211 | 2/2008 |
| JP | 2008-123652 | 5/2008 |
| JP | 2009-134785 | 6/2009 |
| WO | 03-090215 | 10/2003 |

* cited by examiner

OPTICAL INFORMATION RECORDING METHOD, OPTICAL INFORMATION RECORDING DEVICE, OPTICAL INFORMATION REPRODUCTION METHOD, OPTICAL INFORMATION REPRODUCTION DEVICE, AND OPTICAL INFORMATION RECORDING MEDIUM

TECHNICAL FIELD

The present invention relates to an optical information recording method and an optical information recording device for recording information on an optical information recording medium by laser beam irradiation, to an optical information reproduction method and an optical information reproduction device for reproducing an information from an optical information recording medium by laser beam irradiation, and to an optical information recording medium provided with two or more information layers.

BACKGROUND ART

When a recording layer constituted by a thin film of a phase-change recording material formed on a substrate is irradiated with a laser light and locally heated, the recording layer can be changed to states with optical constants that differ depending on the difference in irradiation conditions. The optical information recording medium (also referred to hereinbelow as optical recording medium) can be used for optically recording, erasing, rewriting, and reproducing information by using laser light. The optical recording media have been widely researched, developed, and marketed.

In an optical recording medium of a phase change type, the information is recorded by the state of the phase-change material constituting the recording layer is changed, for example, between a crystalline phase and an amorphous phase by the heat generated by laser light irradiation. The reproduction of information is performed by detecting the difference in the reflectance between the crystalline phase and amorphous phase.

Among the optical recording media, a rewritable optical recording medium makes it possible to delete or rewrite information by using a phase-change recording material, in which reversible phase changes are induced, for the recording layer. In the rewritable optical recording medium, the initial state of the recording layer is typically a crystalline phase. When information is recorded, the recording layer is melted by irradiation with a high-power laser light and then rapidly cooled, thereby converting the laser-irradiated portion into an amorphous phase. Meanwhile, when information is deleted, laser light with power lower than that during the recording is radiated, the temperature of the recording layer is raised, and the recording layer is then gradually cooled to convert the laser-irradiated portion into a crystalline phase. By irradiating the recording layer with laser light subjected to power modulation with high power and lower power, it is possible to record new information, while deleting the already recorded recording, that is, to rewrite information. In the rewritable optical recording medium, the amorphous portion is a mark and the crystalline portion is a space.

In a write-once optical recording medium using a material in which reversible phase changes do not occur, rewriting of information is impossible and information can be recorded only once.

A metal layer with a high thermal conductivity is used in both the rewritable optical recording media and the write-once optical recording media with the object of efficiently cooling during recording.

The reproduction of information recorded on the optical recording medium is performed by examining the difference in reflectance between the crystalline phase and amorphous phase. More specifically, the reproduction of information is performed by detecting the intensity of reflected light from the optical recording medium as a signal when the optical recording medium is irradiated with laser light that has been set to a certain constant reproduction power.

A variety of techniques for increasing the capacity of optical recording media have been studied. For example, a method is known by which minimum sizes of mark length and space length are reduced to increase the recording density. Where such a method is used, a problem is associated with the decreased S/N ratio in the reproduction signal. In addition, thermal interference occurs, which is a phenomenon in which heat generated when a mark is recorded propagates in the space portion and affects the cooling process of the adjacent mark. A problem arising when such thermal interference occurs is that edge positions of marks change and an error ratio during reproduction increases.

Further, a problem encountered even when marks and spaces of correct length are formed is that edge positions of short marks and spaces that are detected during reproduction are reproduced with a difference from ideal values due to a frequency characteristic of the reproduction optical system determined by the size of light spot. Such a shift between the detected edge and the ideal value is typically called inter-code interference. The problem arising when the size of marks and spaces is less than the light spot is that the inter-code interference becomes significant, jitter during reproduction increases, and the error ratio also increases.

Accordingly, a method has been disclosed in which recording is performed by binary driving the laser power, changing the position of the leading end of a mark according to the mark length of the mark that will be recorded and the space length of a space immediately before this mark, and changing the position of the trailing end of the mark according to the mark length of the mark that will be recorded and the space length of a space immediately after this mark (see, for example, Patent Literature 1). Such an adjustment of a control parameter of the recording pulse selected during mark recording compensates the occurrence of thermal interference between the marks during high-density recording and the occurrence of inter-code interference caused by the frequency characteristic during reproduction.

With the method representing another approach to increasing the capacity of optical recording media, a rewritable optical recording medium is used that is provided with two information layers, and information is recorded to or reproduced from the two information layers by laser light incident from one surface of the rewritable optical recording medium. By using two information layers, it is possible to double the recording capacity of the optical recording medium.

With the optical recording medium in which information is recorded on and reproduced from two information layers by laser light incident from one surface of the optical recording medium, the recording or reproduction of information on or from the information layer (referred to hereinbelow as the first information layer) that is farther from the incidence side is performed by laser light transmitted by the information layer (referred to hereinbelow as the second information layer) that is closer to the incidence side. In other words, where the transmissivity of the second information layer is low, the energy of laser light reaching the first information layer is reduced. Therefore, the reflectance from the first information layer is substantially reduced and quality of reproduced information is degraded. Likewise, the laser power necessary to record information advantageously on the first information layer increases, and when this laser power exceeds a limit set for the recording device, advantageous recording cannot be performed, and quality of recorded information is degraded.

Therefore, it is preferred that the second information layer have as high a transmittance as possible. Further, in order to increase the number of information layers with the object of increasing capacity, for example, to realize an optical recording medium provided with three or four information layers, it is necessary to increase further the transmittance of the information layers (third information layer or fourth information layer) on the laser light incidence side. Since metal layer materials typically have a high attenuation factor, it is preferred that the thickness of the metal layer of the information layer on the laser light incidence side be small in order to impart a high transmittance to the information layer on the laser light incidence side.

However, in a recordable optical recording medium, the cooling rate of the heat generated during recording typically decreases with the decrease in thickness of the metal layer. Therefore, heat propagation to the zone outside of the laser light irradiation area increases and the boundaries between the marks and spaces are blurred, thereby degrading the reproduction signal. Accordingly, a technique has been suggested in which a recording pulse is used such that the temperature drops faster when recording is performed on the farthest information layer than when recording is performed on the information layer close to the laser light incidence side (see, for example, Patent Literature 2).

However, a problem associated with the technique described in Patent Literature 2 is that the intensification of thermal interference effect caused by the increase in recording density and the number of layers in the optical recording medium cannot be prevented and a good recording characteristic is difficult to obtain in all of the recording layers.

CITATION LIST

Patent Literature

Patent Literature 1: Japanese Patent Publication No. 2679596
Patent Literature 2: Japanese Patent Application Publication No. 2003-178448

SUMMARY OF INVENTION

The present invention has been created to resolve the above-described problems and it is an object of the present invention to provide an optical information recording method, an optical information recording device, and optical information reproduction method, an optical information reproduction device, and an optical information recording medium that make it possible to record and reproduce information with high quality in all of the information layers of an optical information recording medium.

The one aspect of the present invention resides in an optical information recording method by which marks are formed by irradiation with a laser beam corresponding to a recording pulse sequence modulated between a plurality of power levels and information is recorded based on edge positions of the marks and spaces between the marks, on an optical information recording medium provided with N (N is an integer equal to or greater than 2) information layers each having a recording layer in which variations in a physical state are caused by local temperature variations caused by convergence of a laser beam, the optical information recording method including: a step of selecting control parameters of the recording pulse sequence for forming the marks on the basis of combinations of a mark length of the mark, a first space length of a first space immediately before the mark, and a second space length of a second space immediately after the mark; and a step of recording the marks by the recording pulse sequence determined by the selected control parameters, wherein in the step of selecting control parameters of the recording pulse sequence, the first space length is classified into m types (m is an integer), and the second space length is classified into n types (n is an integer), at least either of the m and the n being equal to or greater than 2; the control parameters include (m×n) control parameters each corresponding to a combination of the first space length and the second space length; and an absolute value of a difference between two predetermined control parameters from among the (m×n) control parameters selected during recording on a second information layer located on an incidence side of the laser beam with respect to a predetermined first information layer from among the N information layers is equal to or greater than an absolute value of a difference between two predetermined control parameters from among the (m×n) control parameters selected during recording on the first information layer.

With such a configuration, control parameters of the recording pulse sequence for forming the marks are selected on the basis of combinations of the mark length of a mark, the first space length of the first space immediately before the mark, and the second space length of the second space immediately after the mark. The marks are recorded by the recording pulse sequence determined by the selected control parameters. When the control parameters of the recording pulse sequence are selected, the first space length is classified into m types (m is an integer) and the second space length is classified into n types (n is an integer). At least either of the m and the n is equal to or greater than 2. The control parameters include (m×n) control parameters each corresponding to a combination of the first space length and the second space length. An absolute value of a difference between two predetermined control parameters from among the (m×n) control parameters selected during recording on a second information layer located on an incidence side of the laser beam with respect to a predetermined first information layer from among the N information layers is equal to or greater than an absolute value of a difference between two predetermined control parameters from among the (m×n) control parameters selected during recording on the first information layer.

In accordance with the present invention, the variation amount of the control parameters of the recording pulse sequence that is selected during recording on the second information layer located on an incidence side of the laser beam with respect to the predetermined first information layer from among N information layers increases. Therefore, high-quality recording of information can be performed even when the information layer on the incidence side of the laser beam has a low thermal conductivity. As a result, a high transmittance can be realized by reducing the thickness of the metal layer of the information layer on the incidence side of the laser beam, and information can be recorded and reproduced with high quality in all of the information layers of the optical information recording medium.

Objects, specific features, and merits of the present invention will become more apparent from the detailed description presented below and the appended drawings.

DESCRIPTION OF EMBODIMENTS

Figure 1:
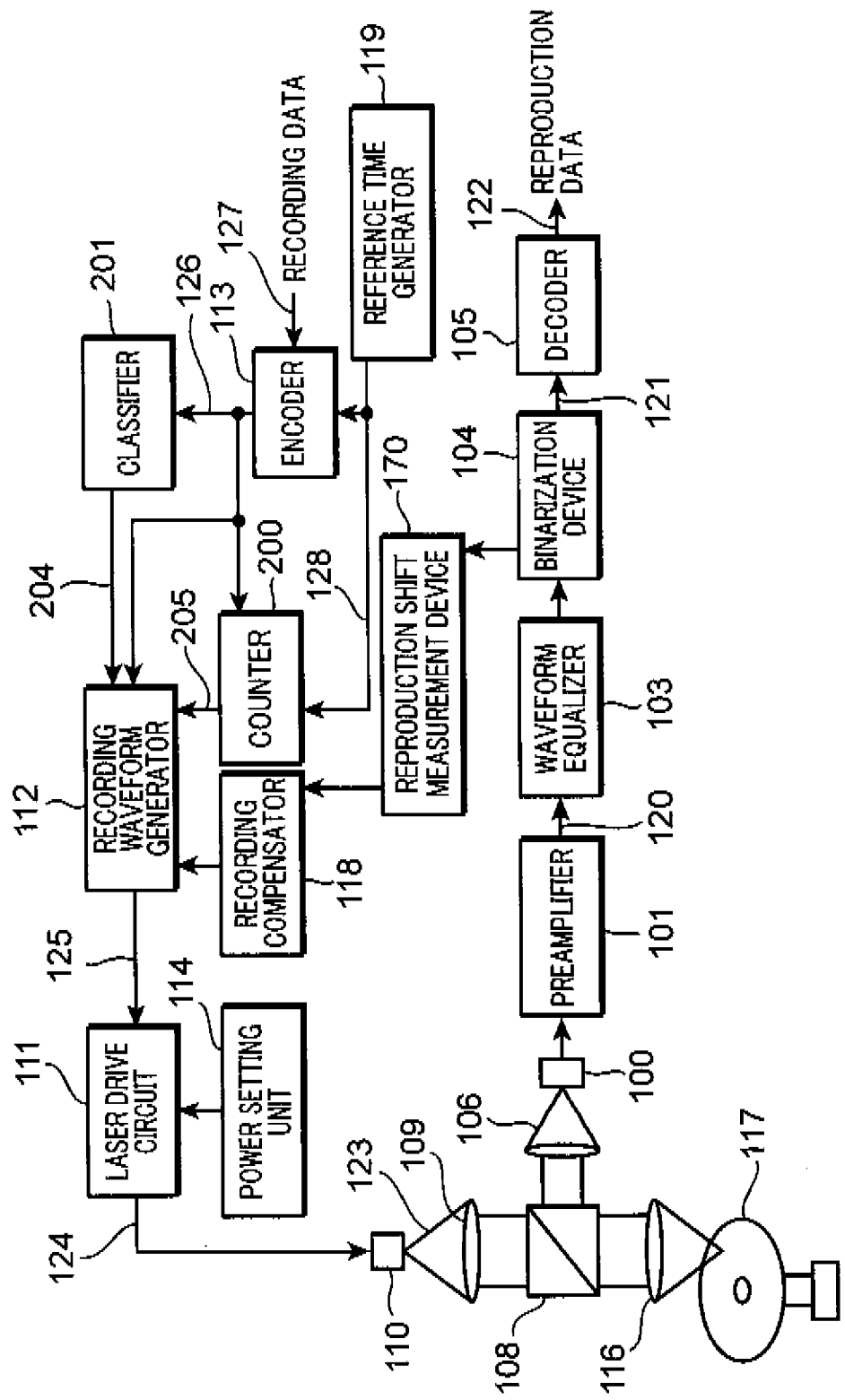
FIG. 1 is a block diagram illustrating the configuration of the optical recording and reproduction device according to an embodiment of the present invention.

Embodiments of the present invention will be explained below with reference to the appended drawings. The below-described embodiments are merely examples, and the present invention is not limited to the below-described embodiments. In the embodiments, a rewritable optical recording medium that uses reversible phase changes is explained by way of example as a recording medium, but the technique described is also applicable to a write-once optical recording medium. In the below-described embodiments, like components are assigned with like reference numerals and the redundant explanation thereof is omitted.

FIG. 1 is a block diagram illustrating the configuration of an optical recording and reproduction device according to an embodiment of the present invention. The optical recording and reproduction device shown in FIG. 1 is provided with a recording optical system including an encoder 113, a reference time generator 119, a counter 200, a classifier 201, a recording waveform generator 112, a recording compensator 118, a laser drive circuit 111, a power setting unit 114, a laser light source 110, and an objective lens 116 as a recording system. Further, the optical recording and reproduction device shown in FIG. 1 is provided with a reproduction optical system including a detection lens 106 and the like, a photodetector 100, a preamplifier 101, a waveform equalizer 103, a binarization device 104, a decoder 105, an a reproduction shift measurement device 170 as a reproduction system. The above-mentioned recording optical system includes the objective lens 116, a collimator lens 109, and a half-mirror 108, and the abovementioned reproduction optical system includes the detection lens 106, the objective lens 116, and the half-mirror 108.

First, constituent members of the optical recording and reproduction device shown in FIG. 1 will be explained. The encoder 113 converts recording data 127, which will be recorded, into a recording code sequence (NRZI sequence) 126 representing a mark length and a space length of marks and spaces that will be formed on an optical disk 117 and a header portion information of the marks and spaces. The recording code sequence 126 is transmitted to the classifier 201, the recording wavelength generator 112, and the counter 200.

The classifier 201 classifies the marks of the recording code sequence 126 according to a predetermined rule on the basis of the mark length (code length) of the mark, the space length of the space immediately before the mark, and the space length of the space immediately after the mark. The classifier 201 outputs the classification results as a classification signal 204 to the recording waveform generator 112.

The counter 200 refers to the recording code sequence 126, counts the time from the header position of the mark by taking a reference time signal 128 generated by the reference time generator 119 as a unit, and generates a count signal 205. The encoder 113 and the recording waveform generator 112 are synchronized by the reference time signal 128. The reference time signal 128 is generated from a signal synchronized by applying a PLL (Phase Locked Loop) to a signal read out from a wobble on the optical disk 117.

The recording compensator 118 reads information that has been recorded in advance in a specific region on the optical disk 117 and holds recording compensation table data which are pulse position movement amounts of recording pulse waveforms generated by the recording waveform generator 112 and correspond to the mark length of each mark, length of the space immediately before each mark, and length of the space immediately after each mark. The recording compensator 118 sends the recording compensation table data to the recording waveform generator 112.

The recording waveform generator 112 compensates the pulse-shaped waveform on the time axis according to the recording code sequence (NRZI sequence) 126, classification signal 204, and recording compensation table data. As a result, the recording code sequence 126 is converted into a recording pulse signal 125 corresponding to the recording waveform. The recording pulse signal 125 is constituted by three-stage levels corresponding to the laser power levels.

The recording waveform generator 112 selects a control parameter of the recording pulse sequence for forming marks on the basis of combinations of the mark length of the mark, a first space length of a first space immediately before the mark, and a second space length of a second space immediately after the mark.

The control parameter is at least one from a position of the pulse edge of the leading end of the recording pulse sequence, a position of the second pulse edge from the leading end of the recording pulse sequence, a position of the pulse edge of the trailing end of the recording pulse sequence, and a position of the second pulse edge from the trailing end of the recording pulse sequence.

The recording compensator 118 stores a recording compensation table relating to edge variation amounts dTS1, dTS2, dTE1, and dTE2 that change the positions of pulse edges of the recording pulse signal 125 as will be described hereinbelow. The recording compensator 118 sends the recording compensation table to the recording waveform generator 112, and the recording waveform generator 112 classifies the pulses of each mark length according to the aforementioned classification signal 204 and sends the recording pulse signal 125 in which the position and width of each recording pulse has been compensated to the laser drive circuit 111.

The laser drive circuit 111 sets laser power corresponding to respective three levels (peak power level Pw, erase power level Pe, and bottom power level Pb) of the recording pulse signal 125 at a power level set by the power setting unit 114, and drives the laser light source 110 by a laser drive current 124. The laser light source 110 radiates pulse-shaped light onto the optical disk 117 and forms a recording mark. The laser drive circuit 111 records the marks by the recording pulse sequence based on the selected control parameter.

In the present embodiment, the optical recording and reproduction device corresponds to an example of an optical information recording device and an optical information reproduction device, the recording waveform generator 112 corresponds to an example of a selection unit, and the laser drive circuit 111 corresponds to an example of a recording unit.

A method for recording information on the optical disk 117 in the recording system of the optical recording and reproduction device will be explained below.

The recording pulse signal 125 is sent to the laser drive circuit 111. The laser drive circuit 111 generates the laser drive current 124 according to the level of the recording pulse signal 125 with reference to the recording pulse signal 125 and the power that has been set by the power setting unit 114 and causes the laser light source 110 to emit light according to a predetermined recording wavelength of the recording pulse signal 125. A laser light 123 emitted from the laser light source 110 is converged on the optical disk 117 via the collimator lens 109, the half-mirror 108, and the objective lens 116, the recording layer is heated, and marks and spaces are formed.

A method for reproducing information from the optical disk 117 in the reproduction system of the optical recording and reproduction device will be explained below.

When information is reproduced, the laser light source 110 emits the laser light 123 at a low power level such that the recorded marks are not destroyed, and scans the row of marks on the optical disk 117. The reflected light from the optical disk 117 falls on the detection lens 106 through the objective lens 116 and the half-mirror 108. The laser light is condensed on the photodetector 100 through the detection lens 106. The condensed light is converted into an electric signal according to the light intensity distribution on the photodetector 100. The electric signal is amplified by the preamplifier 101 provided at each photodetector 100, and a reproduction signal 120 is obtained that corresponds to the presence/absence of the mark at the scanning position on the optical disk 117. The reproduction signal 120 is subjected to waveform equalization processing with the waveform equalizer 103. The reproduced signal 120 subjected to the waveform equalization processing is converted into binary data of "0" and "1" in the binarization device 104, synchronized by the PLL, and converted into a binarized reproduction signal 121. The decoder 105 subjects the binarized reproduction signal 121 to a conversion reversed with respect to that in the encoder 113 and generates reproduction data 122.

In this case, for example, the frequency of the reference time signal 128 is 132 MHz, and Tw (channel clock period) is about 7.5 nsec. The optical disk 117 rotates at a constant linear speed of 7.38 msec. The laser light source 110 is constituted by a semiconductor laser light source and emits laser light with a wavelength of 405 nm. The NA of the objective lens 116 is 0.85. The optical disk 117 is a multilayer disk having a plurality of information layers and may be a dual-layer disk, a triple-layer disk, or a quadruple-layer disk. Further, the optical disk 117 may be not only a rewritable optical disk medium using a phase-change recording material, but also a write-once optical medium that can be recorded only once. The encoding system is (1-7) modulation. In the (1-7) modulation, the shortest encoding length is 2Tw.

Figure 2:
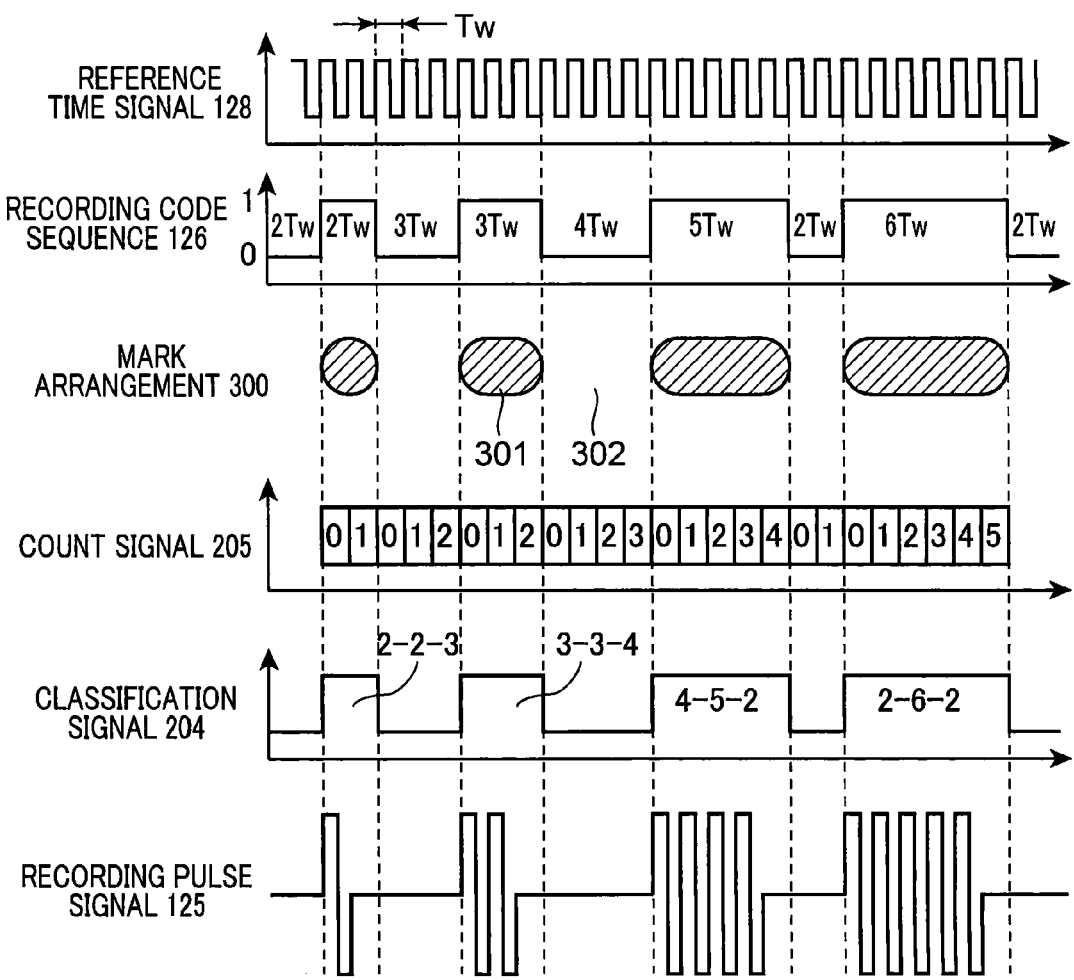
FIG. 2 illustrates an example of marks and spaces in a recording code sequence and recording wavelength generation action of recording the marks and spaces in the optical recording and reproduction device according to the embodiment of the present invention.

FIG. 2 illustrates an example of marks and spaces in a recording code sequence and recording waveform generation action of recording the marks and spaces in the optical recording and reproduction device according to the embodiment of the present invention.

The reference time signal 128 in FIG. 2 represents a time reference for the recording action and has a period of Tw. The recording code sequence 126 shown in FIG. 2 represents the results obtained by NRZI conversion of the recording data 127 in the encoder 113. Here, Tw is a detection window width and a minimum unit of variation amounts of the mark length and space length in the recording code sequence 126. The mark arrangement 300 in FIG. 2 shows an image of a mark 301 and a space 302 that are actually recorded on the optical disk 117. The laser light spot is scanned from the left to the right in FIG. 2. The mark 301 corresponds at a one-to-one ratio to the level "1" in the recording code sequence 126 and is formed to have a length proportional to the period thereof. The count signal 205 in FIG. 2 is obtained by measuring the time from the header of the mark 301 and space 302 in Tw units.

The classification signal 204 in FIG. 2 represents schematically the classification signal in the optical recording and reproduction device of the present embodiment. In the present example, the classification is performed by a combination of three values, namely, a value of the mark length of each mark, the space length of the space immediately before each mark, and the space length of the space immediately after each mark. For example, "4-5-2" in the classification signal 204 in FIG. 2 relates to a mark with a mark length 5Tw and indicates that the space length of the space immediately before this mark is 4Tw, and the space length of the space immediately after this mark is 2Tw. In the present embodiment, the letter "w" in 4Tw and 2Tw is omitted and only 4T and 2T are sometimes used to represent the space length. Further, the space length is sometimes represented by 4Ts, and the mark length is sometimes represented by 2Tm.

The recording pulse signal 125 in FIG. 2 corresponds to the recording code sequence 126 in FIG. 2 and is an example of an actually recorded light waveform. The recording pulse signals 125 are generated with reference to the count signal 205, recording code sequence 126, classification signal 204, and recording compensation table data sent from the recording compensator 118.

The recording compensation method in the optical recording and reproduction device of the present embodiment will be described below.

Figure 3:
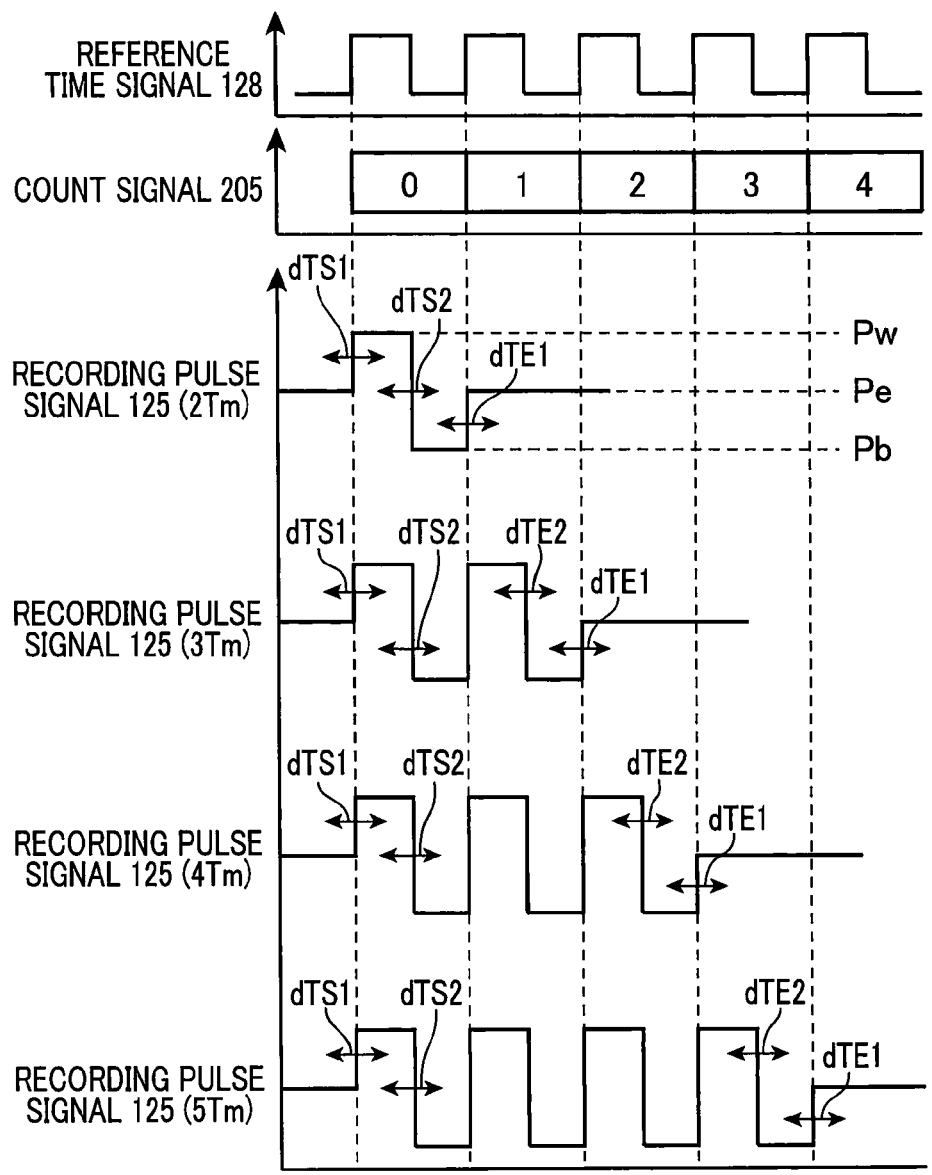
FIG. 3 is a schematic diagram illustrating the relationship between the mark length of a mark and the recording wavelength of a recording pulse signal.

FIG. 3 is a schematic diagram illustrating the relationship between the mark length of a mark and the recording waveform of the recording pulse signal 125. The reference time signal 128 in FIG. 3 serves as a time reference for the recording operation and has a period of Tw. The count signal 205 in FIG. 3 is generated by the counter 200, and the time from the header of the mark is counted in the units of reference time Tw of the reference time signal 128. The timing at which the count signal 205 moves to zero corresponds to the header of the mark or space. The recording pulse signal 125 in FIG. 3 is obtained when a recording mark is formed. FIG. 3 shows the recording pulse signal 125 of the 2Tw (Tm) mark, the recording pulse signal 125 of the 3Tw (Tm) mark, the recording pulse signal 125 of the 4Tw (Tm) mark, and the recording pulse signal 125 of the 5Tw (Tm) mark. The recording pulse signal 125 is level modulated. The modulation is performed by three values of the peak power level (Pw), which is the highest level, the erase power level (Pe), which is an intermediate level, and the bottom power level (Pb), which is the lowest level. After the final pulse, the cooling pulse is formed by the bottom power level.

In this case, a three-value modulation of power level is used, but different levels may be also used for the bottom power level of the cooling pulse after the final pulse and the bottom power level between the intermediate pulses, thereby enabling a four-value modulation. Further, in FIG. 3, the bottom power level is taken to be lower than the erase power level, but the bottom power level may be also a power level between the erase power level and the peak power level. In FIG. 3, the recording pulse signal of the 4Tw mark has one intermediate pulse, but where the mark length (code length) is extended by 1Tw, that is, to 5Tw and 6Tw, the number of the intermediate pulses is accordingly increased by one.

With the recording compensation (adaptive compensation) of the present embodiment, each mark is classified by mark length, space length of the space immediately before the mark, and space length of the space immediately after the mark. Further, the positions of the pulse edges of the recording pulse sequence in which the marks are recorded changes by the edge variation amount dTS1, dTS2, dTE1, and dTE2 according to the classification results. Since the recording pulse signal 125 is thus controlled, the leading end position or trailing end position of the marks formed on the optical disk 117 can be accurately controlled. Furthermore, since the pulse edge is controlled not only according to the mark length of the recorded mark, but also according to the space length of the space immediately before the mark and the space length of the space immediately after the mark, the leading end position or trailing end position of the marks can be controlled with even better accuracy with consideration for inter-code interference.

Figure 4:
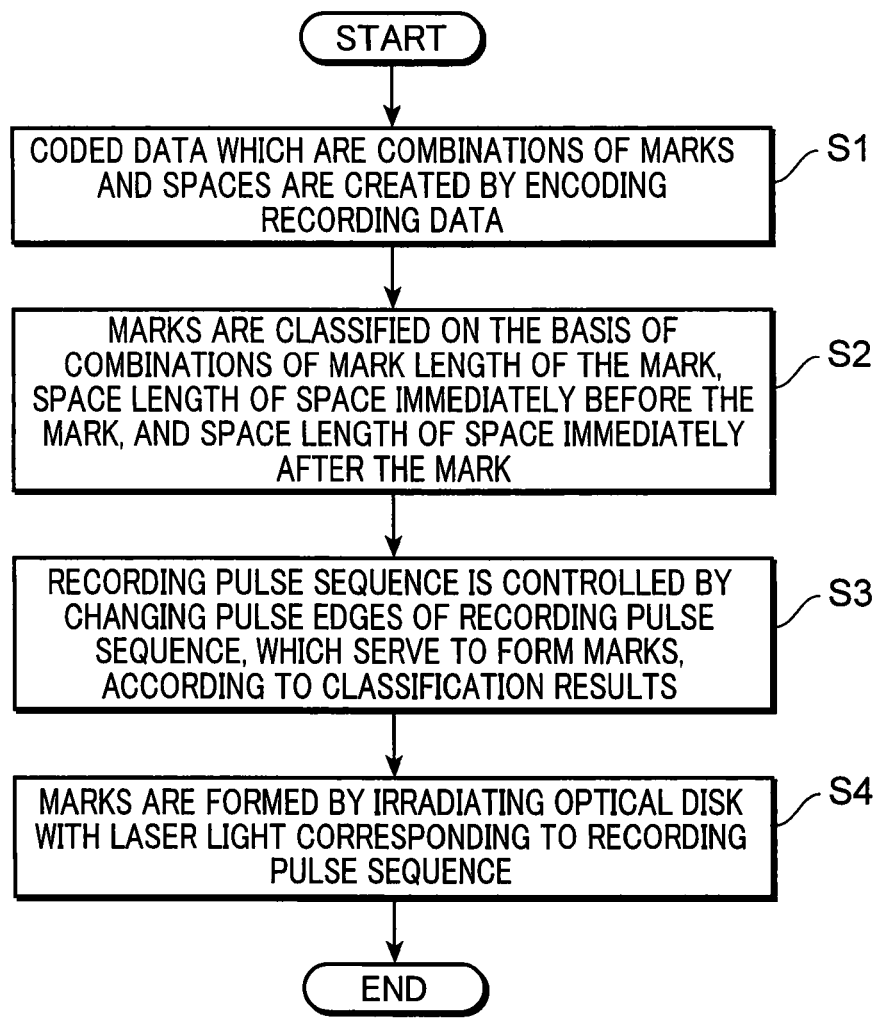
FIG. 4 is a flowchart for explaining the optical information recording method in the optical recording and reproduction device according to the embodiment of the present invention.

The recording compensation method in the optical recording method of the present embodiment is explained below by using the flowchart shown in FIG. 4. FIG. 4 is a flowchart for explaining the optical information recording method in the optical recording and reproduction device according to an embodiment of the present invention.

First, the encoder 113 creates encoded data which are combinations of marks and spaces by encoding recording data (step S1). The encoded data correspond to the recording code sequence 126 in FIG. 2.

Then, the classifier 201 classifies the marks on the basis of combinations of the mark length of the mark, the space length of the space immediately before the mark, and the space length of the space immediately after the mark (step S2). In the classification signal 204 in FIG. 2, the 2T mark is classified as "2-2-3", the 3T mark is classified as "3-3-4", the 5T mark is classified as "4-5-2", and the 6T mark is classified as "2-6-2". The combination in the classification signal 204 is created by using the "front space length", "mark length", and "rear space length" in the order of description. The "front space length" represents the space length of the space immediately before the mark, and the "rear space length" represents the space length of the space immediately after the mark.

The recording waveform generator 112 controls the recording pulse sequence by changing the position of pulse edges in the recording pulse sequence for forming the marks correspondingly to the classification results (step S3). The recording waveform generator 112 selects control parameters of the recording pulse sequence for forming the marks on the basis of combinations of the mark length of the mark, the first space length of the first space immediately before the mark, and the second space length of the second space immediately after the mark.

For example, in the recording pulse signal 125 of the 4Tm mark shown in FIG. 3, the recording waveform generator 112 changes the position of the pulse edge of the leading end by the edge variation amount dTS1, changes the position of the second pulse edge from the leading end by the edge variation amount dTS2, changes the position of the pulse edge of the trailing end by the edge variation amount dTE1, and changes the position of the second pulse edge from the trailing end by the edge variation amount dTE2.

Then, the laser drive circuit 111 generates a laser drive current 124 correspondingly to the recording pulse signal 125 generated by the recording waveform generator 112 and outputs the generated laser drive current 124 to the laser light source 110. The laser light source 110 irradiates the optical disk 117 with the laser beam corresponding to the recording pulse sequence and forms the marks (step S4).

Figure 5:
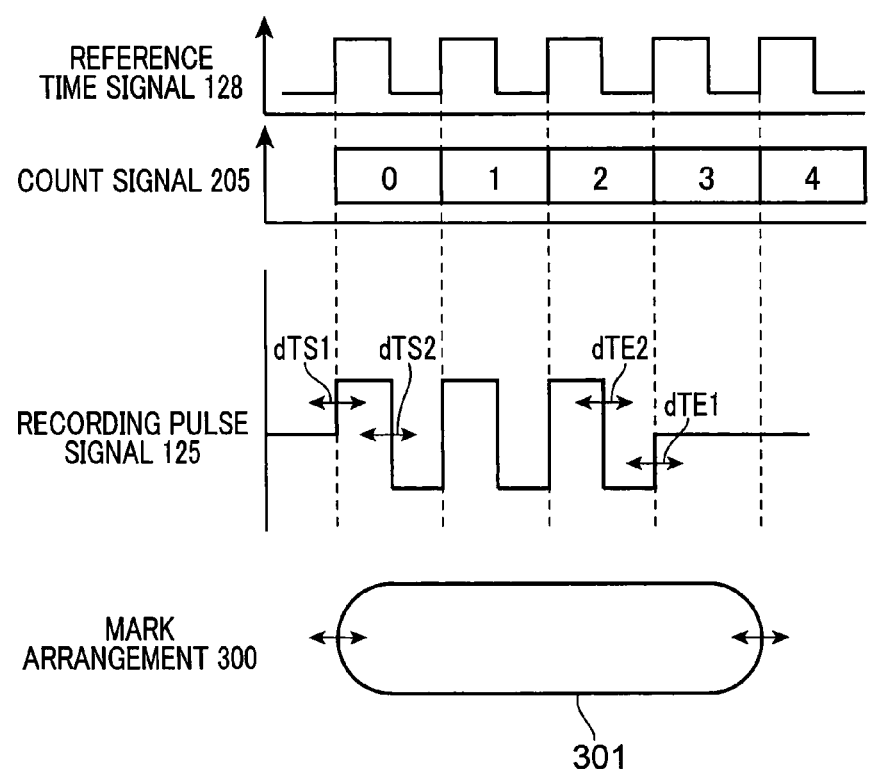
FIG. 5 illustrates an example of control of the recording pulse sequence in the optical information recording method according to the embodiment of the present invention.

FIG. 5 illustrates an example of control of the recording pulse sequence in the optical information recording method according to the embodiment of the present invention. FIG. 5 shows the case where the positions of pulse edges of the recording pulse sequence are changed by the edge variation amounts dTS1, dTS2, dTE1, and dTE2 when a mark 301 with a mark length 4T is recorded. The reference time signal 128 shown in FIG. 5 is a signal serving as a time reference for the recording operation, and the count signal 205 shown in FIG. 5 is a signal generated by the counter 200. In the recording pulse signal (recording pulse sequence) 125 shown in FIG. 5, the positions of pulse edges are changed by the edge variation amounts dTS1, dTS2, dTE1, and dTE2. In the mark arrangement 300 in FIG. 5, an image of the mark 301 is shown which has a mark length 4T and is recorded by the recording pulse signal (recording pulse sequence) 125 shown in FIG. 5. FIG. 5 demonstrates that the leading end position of the mark 301 can be accurately controlled.

As shown in Table 1 below, the edge variation amount dTS1 of the leading end is determined on the basis of results obtained by classification on the basis of the mark length of the mark that will be recorded, the space length of the space immediately before the mark (front space length), and the space length of the space immediately after the mark (rear space length). Table 1 illustrates an example of a recording compensation table relating to the edge variation amount dTS1 of the leading end.

TABLE 1

| | | Mark length | | | | |
| --- | --- | --- | --- | --- | --- | --- |
| | | 2T | | | | |
| | | Rear space length | | | | |
| dTS1 | | 2T | $\geq$3T | 3T | 4T | $\geq$5T |
| Front space length | 2T | a0 | a4 | b0 | c0 | d0 |
| | 3T | a1 | a5 | b1 | c1 | d1 |
| | 4T | a2 | a6 | b2 | c2 | d2 |
| | $\geq$5T | a3 | a7 | b3 | c3 | d3 |

The edge variation amount dTS1 of the leading end is determined by classifying into a total of (4+1)×4=20 categories by classifying the mark length of the mark that will be recorded into four categories, namely, 2T, 3T, 4T, and equal to or greater than 5T, classifying the rear space length into two categories, namely, 2T and equal to or greater than 3T, only when the mark length is 2T, and classifying the front space length into four categories, namely, 2T, 3T, 4T, and equal to or greater than 5T.

Such a classification is selected because the edge variation amount dTS1 relates to the position of the pulse edge of the leading end, and therefore the effect of the front space (space immediately before the mark) becomes predominant, but when the mark length is 2T, the effect of the rear space (space immediately after the mark) also cannot be ignored.

In the present example, the mark length is classified into four categories, the front space length is classified into four categories, and the rear space length is classified into two categories with respect to the edge variation amount dTS1, but such a classification is not limiting. For example, the mark length may be classified into two, three, five, or six and more categories, and the front space length and rear space length may be classified into two, three, four, five, or six and more categories each. The edge variation amount dTS1 may be also determined by the absolute time, for example, so that a1=2 nsec, or by the value of integer multiple of Tw/16 on the basis of the reference time signal 128.

Thus, in the step of selecting the control parameters of the recording pulse sequence, when the shortest mark length is denoted by k, the mark length is classified into at least four types, namely, k, k+1, k+2, and k+3 or greater. The mark length may be classified into at least two types, namely, k and k+1 or greater, and the mark length may also classified into at least three types, namely, k, k+1, and k+2 or greater. In the present embodiment, when the shortest mark length is 2T, the mark length of the k+1 type means a 3T mark length, the mark length of the k+2 type means a 4T mark length, and the mark length of k+3 type means a 5T mark length.

Further, in the step of selecting control parameters of the recording pulse sequence, when the shortest mark length is denoted by k, the first space length (front space length) and the second space length (rear space length) are each classified into at least two types, namely, k and k+1 or greater. The first space length and the second space length may each be classified into at least four types, namely, k, k+1, k+2, and k+3.

The recording wavelength generator 112 controls the recording pulse sequence by referring to a recording compensation table in which the combinations of the mark length, first space length, and second space length are associated with the control parameters.

Similarly to the edge variation amount dTS1, the second edge variation amount dTS2 from the leading end is also determined on the basis of results of classification by the mark length of the mark that will be recorded, the space length of the space immediately before the mark (front space length), and the space length of the space immediately after the mark (rear space length), as shown in Table 2 below. Table 2 shows an example of the recording compensation table relating to the second edge variation amount dTS2 from the leading end.

TABLE 2

| dTS2 | | Mark length | | | | |
| --- | --- | --- | --- | --- | --- | --- |
| | | 2T | | 3T | 4T | ≧5T |
| | | Rear space length | | | | |
| | | 2T | ≧3T | | | |
| Front space length | 2T | e0 | e4 | f0 | g0 | h0 |
| | 3T | e1 | e5 | f1 | g1 | h1 |
| | 4T | e2 | e6 | f2 | g2 | h2 |
| | ≧5T | e3 | e7 | f3 | g3 | h3 |

The edge variation amount dTE1 of the trailing end is determined on the basis of results of classification by the mark length of the mark that will be recorded, the space length of the space immediately before the mark (front space length), and the space length of the space immediately after the mark (rear space length), as shown in Table 3 below. Table 3 shows an example of the recording compensation table relating to the edge variation amount dTE1 of the trailing end.

TABLE 3

| dTE1 | | Mark length | | | | |
| --- | --- | --- | --- | --- | --- | --- |
| | | 2T | | 3T | 4T | ≧5T |
| | | Front space length | | | | |
| | | 2T | ≧3T | | | |
| Rear space length | 2T | i0 | i4 | j0 | k0 | m0 |
| | 3T | i1 | i5 | j1 | k1 | m1 |
| | 4T | i2 | i6 | j2 | k2 | m2 |
| | ≧5T | i3 | i7 | j3 | k3 | m3 |

The edge variation amount dTE1 of the trailing end is determined by classifying into a total of (4+1)×4=20 categories by classifying the mark length of the mark that will be recorded into four categories, namely, 2T, 3T, 4T, and equal to or greater than 5T, classifying the front space length into two categories, namely, 2T and equal to or greater than 3T, only when the mark length is 2T, and classifying the rear space length into four categories, namely, 2T, 3T, 4T, and equal to or greater than 5T.

Such a classification is selected because the edge variation amount dTE1 relates to the position of the pulse edge of the trailing end, and therefore the effect of the rear space becomes predominant, but when the mark length is 2T, the effect of the front space also cannot be ignored.

In the present example, the mark length is classified into four categories, the rear space length is classified into four categories, and the front space length is classified into two categories with respect to the edge variation amount dTE1, but such a classification is not limiting. For example, the mark length may be classified into two, three, five, or six and more categories, and the front space length and rear space length may be classified into two, three, four, five, or six and more categories each. The edge variation amount dTE1 may be also determined by the absolute time, for example, so that i1=2 nsec, or by the value of integer multiple of Tw/16 on the basis of the reference time signal 128.

The second edge variation amount dTE2 from the trailing end is determined on the basis of results of classification by the mark length of the mark that will be recorded, the space length of the space immediately before the mark (front space length), and the space length of the space immediately after the mark (rear space length), as shown in Table 4 below. Table 4 shows an example of the recording compensation table relating to the second edge variation amount dTE2 from the trailing end.

TABLE 4

| dTE2 | | Mark length | | |
|---|---|---|---|---|
| | | 3T | 4T | ≧5T |
| Rear space length | 2T | p0 | q0 | r0 |
| | 3T | p1 | q1 | r1 |
| | 4T | p2 | q2 | r2 |
| | ≧5T | p3 | q3 | r3 |

The second edge variation amount dTE2 from the trailing end is determined by classifying into a total of 3×4=12 categories by classifying the mark length of the mark that will be recorded into three categories, namely, 3T, 4T, and equal to or greater than 5T, and classifying the rear space length into four categories, namely, 2T, 3T, 4T, and equal to or greater than 5T.

The edge variation amount dTE2 is a position of the second pulse edge from the trailing end. The edge variation amount dTE2 of the 2T mark matches the second edge variation amount dTS2 from the leading end and is therefore not defined.

In the present example, the mark length is classified into three categories and the rear space length is classified into four categories with respect to the edge variation amount dTE2, but such a classification is not limiting. For example, the mark length may be classified into two, four, or five and more categories and the rear space length may be classified into two, three, five, or six and more categories. The edge variation amount dTE2 may be also determined by the absolute time, for example, so that p1=2 nsec, or by the value of integer multiple of Tw/16 on the basis of the reference time signal 128.

As mentioned hereinabove, the leading end position of the mark 301 can be more accurately controlled by changing the position of the pulse edge of the leading end of the recording pulse signal 125 by the edge variation amount dTS1, dTS2, dTE1, and dTE2. Furthermore, since the pulse edge is controlled accordingly not only to the mark length of the mark that will be recorded, but also to the front space length, the leading end position of the mark 301 can be controlled even more accurately with consideration for the inter-code interference.

In the step of selecting the control parameters of the recording pulse sequence, the first space length (front space length) is classified into m types (m is an integer) and the second space length (rear space length) is classified into n types (n is an integer). At least either of the m and the n is equal to or greater than 2. The control parameters include (m×n) control parameters each corresponding to a combination of the first space length and the second space length. The absolute value of a difference between two predetermined control parameters from among the (m×n) control parameters selected during recording on the second information layer located on the incidence side of the laser beam with respect to the predetermined first information layer from among the N information layers is equal to or greater than the absolute value of a difference between the two predetermined control parameters from among the (m×n) control parameters selected during recording on the first information layer.

With respect to the edge variation amounts dTS1, dTS2, dTE1, and dTE2, the classification of the front space length and rear space length may be simplified into two categories, namely, 2T and equal to or greater than 3T, as shown in Table 5 to Table 8 below. Table 5 shows an example of the recording compensation table relating to the edge variation amount dTS1 of the leading end. Table 6 shows an example of the recording compensation table relating to the second edge variation amount dTS2 from the leading end. Table 7 shows an example of the recording compensation table relating to the edge variation amount dTE1 of the trailing end. Table 8 shows an example of the recording compensation table relating to the second edge variation amount dTE2 from the trailing end.

TABLE 5

| | | Mark length | | |
|---|---|---|---|---|
| | | 2T | | |
| | | Rear space length | | |
| dTS1 | | 2T | ≧3T | ≧3T |
| Front space length | 2T | A0 | A2 | B0 |
| | ≧3T | A1 | A3 | B1 |

TABLE 6

| | | Mark length | | |
|---|---|---|---|---|
| | | 2T | | |
| | | Rear space length | | |
| dTS2 | | 2T | ≧3T | ≧3T |
| Front space length | 2T | E0 | E2 | F0 |
| | ≧3T | E1 | E3 | F1 |

TABLE 7

| | | Mark length | | |
|---|---|---|---|---|
| | | 2T | | |
| | | Front space length | | |
| dTE1 | | 2T | ≧3T | ≧3T |
| Rear space length | 2T | I0 | I2 | J0 |
| | ≧3T | I1 | I3 | J1 |

TABLE 8

| dTE2 | | Mark length |
|---|---|---|
| | | 3T |
| Rear space length | 2T | P0 |
| | ≧3T | P1 |

When laser light is converged on the optical disk 117 and high-density recording is performed, the smallest recording mark and space become about as small as the light spot. Therefore, inter-code interference occurs between the signals relating to the shortest mark and shortest space due to the effect of optical MTF (Modulation Transfer Function) and recording to the correct edge position or reproduction therefrom cannot be performed. Therefore, when it is possible to obtain a sufficient recording characteristic that takes into account the inter-code interference by separating the shortest 2T space length from other space lengths, the recording compensation table can be simplified by using the above-described simplified classification. The resultant merit is that the device can be simplified.

The recording compensation tables relating to the above-mentioned edge variation amounts dTS1, dTS2, dTE1, and dTE2 will be further described below.

The recording compensation tables stored in the recording compensator 118 can be acquired by either of the below-described two methods. With the first method, the recording compensator 118 reads the recording compensation table that has been recorded in advance during disk manufacture or after the disk has been manufactured in a region of the optical disk 117 that is called a read-in area, and the recording compensation table that has been read is stored. With the second method, the recording compensator 118 actually performs test writing with the predetermined recording pulse sequence to a test writing area on the optical disk 117, reproduces the marks and spaces that have been test written, measures the edge shift amount, and acquires a recording compensation table by learning the results determined in the process of searching the conditions with the best signal quality.

With the first method, the recording compensation table recorded to the predetermined area of the optical disk 117 is obtained as reproduction data and stored in the recording compensator 118.

Figure 6:
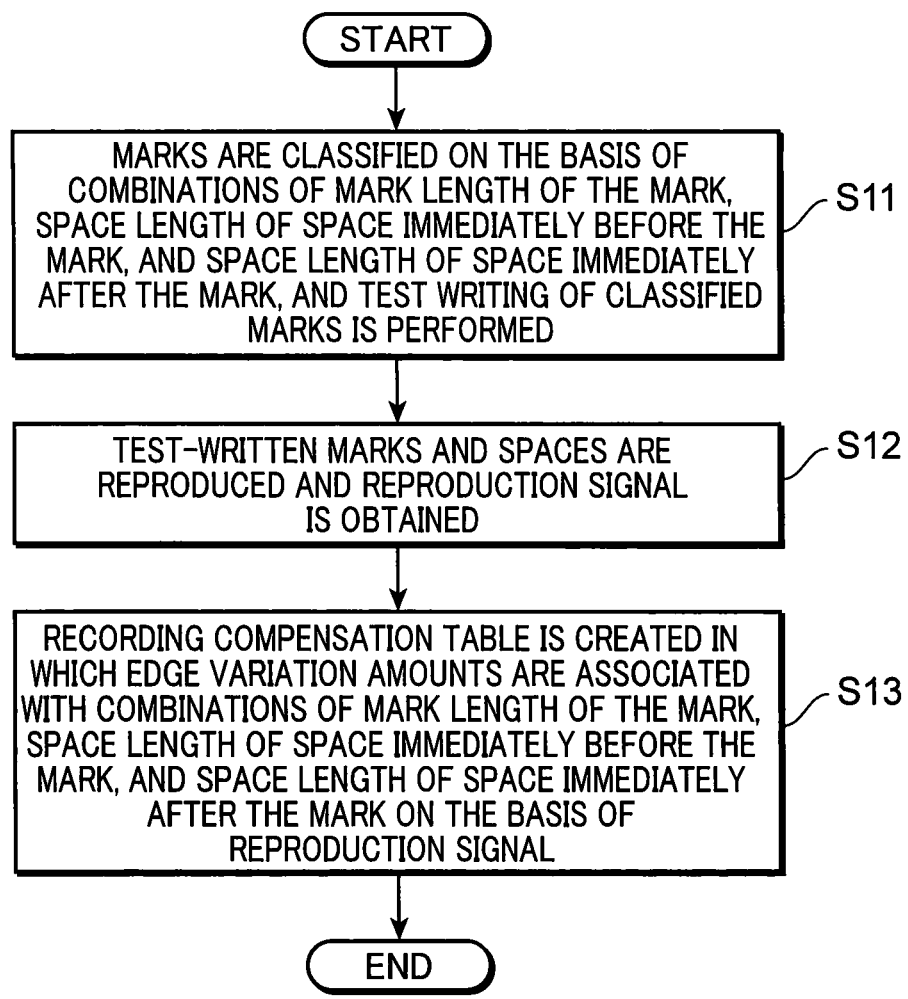
FIG. 6 is a flowchart for explaining a method for creating a recording compensation table in the optical information recording method according to the embodiment of the present invention.

A method for creating a recording compensation table by performing test writing of the predetermined recording code sequence on the optical disk 117 in the second method will be explained below by using the flowchart shown in FIG. 6. FIG. 6 is a flowchart for explaining a method for creating a recording compensation table in the optical information recording method according to the embodiment of the present invention.

First, the optical recording and reproduction device classifies the marks on the basis of combinations of the mark length of the mark, the space length of the space immediately before the mark, and the space length of the space immediately after the mark and test writes the classified marks to the test writing area on the optical disk 117 (step S11). In this case, the optical recording and reproduction device test writes the marks having the mark lengths of 2T, 3T, 4T, and 5T and also test writes the front spaces having the space lengths 2T, 3T, 4T, and 5T and the rear spaces having the space lengths 2T, 3T, 4T, and 5T with respect to each corresponding mark.

The optical recording and reproduction device then reproduces the marks and spaces that have been test written and obtains a reproduction signal (step S12).

The optical recording and reproduction device then creates recording compensation tables in which edge variation amounts are associated with combinations of the mark length of the mark, the space length of the space immediately before the mark, and the space length of the space immediately after the mark on the basis of the reproduction signal (step S13). As a result, the optical recording and reproduction device creates the recording compensation tables shown in Table 1 to Table 4 or the recording compensation tables shown in Table 5 to Table 8. An electric signal obtained by photoelectric conversion in the photodetector 100 is amplified in the preamplifier 101 and the reproduction signal 120 is obtained. This signal is processed in the waveform equalizer 103 and the binarization device 104 to obtain the binarized reproduction signal 121. The obtained binarized reproduction signal 121 is sent not only to the decoder 105, but also to the reproduction shift measurement device 170. The reproduction shift measurement device 170 compares the binarized reproduction signal that has been synchronized by the PLL with the binarized reproduction signal prior to synchronization, measures the shift amount (edge variation amount) for each mark and space, and transmits the measurement results to the recording compensator 118.

When the test recording is thus performed in the test writing area on the optical disk 117, the optical recording and reproduction device may update at all times the recording compensation table data according to the measured edge variation amount, perform again the above-described recording operation, and perform repeatedly a recording operation to search the recording compensation table such that reduces the edge shift of the PLL clock and the binarized reproduction signal during reproduction.

Further, since the mark length or space length is small, the detection of the edge shift is difficult, and when the signal pattern is determined by a PRML (Partial Response Maximum Likelihood) method, a shift component of the MLSE (Maximum Likelihood Sequence Estimation) value may be measured instead of the usual shift amount of the edge.

In the recording pulse of the present embodiment, where the mark length to be recorded is increased by 1, the number of pulses increases by 1, but it is the positions of the pulse edges that are of importance and the rule relating to the number of pulses may be different. For example, where the mark length to be recorded increases by 2, the number of pulses may increase by 1, or a cooling pulse following the final pulse may be omitted.

An optical information reproduction method using the optical recording and reproduction device according to an embodiment of the present invention will be explained below. A specific feature of the optical information reproduction method of the embodiment is that wave equalization having the wave characteristic shown in FIG. 7 is performed.

With the optical information reproduction method of the present embodiment, the marks recorded on the optical disk 117 are read with laser light and a reproduction signal 120 is generated by using the detection lens 106, the photodetector 100, and the preamplifier 101. The reproduction signal 120 is a signal in which the frequency characteristic has been corrected by the wavelength equalizer 103. Further, the reproduction signal 120 having the corrected frequency characteristic is converted into the binarized reproduction signal 121 by the binarization device 104 and inversely converted by the decoder 105 to generate the reproduction data 122.

Since the marks are smaller for signals with a higher frequency, such as the 2Tw signal from among the 2Tw signal, 3Tw signal, 4Tw signal, and 8Tw signal, the attenuation of optical output depending on frequency, that is, the decrease in the amplitude of the signal to be reproduced, is observed. Accordingly, in the optical information reproduction method of the present embodiment, an equalizer characteristic is set such that the output amplitude is increased for the signals with a high frequency in order to compensate such an attenuation of output.

Figure 7:
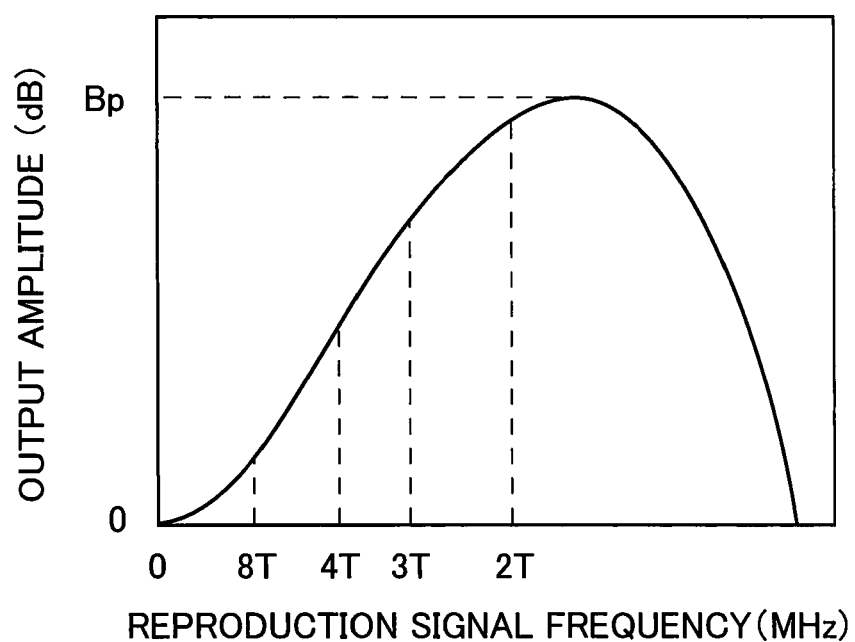
FIG. 7 illustrates schematically the frequency characteristic of the waveform equalizer according to the embodiment of the present invention.

FIG. 7 illustrates schematically the frequency characteristic of the waveform equalizer 103 according to the embodiment of the present invention and represents the amplitude ratio of the output signal to the input signal. In FIG. 7, the reproduction signal frequency is plotted against the abscissa, and the frequencies of the 2Tw signal, 3Tw signal, 4Tw signal, and 8Tw signal are schematically shown therein. A logarithm of the output amplitude of the waveform equalizer 103 is plotted against the ordinate. A high pass filter, a band pass filter having a peak at a frequency somewhat higher than 2Tw, or a combination of a high pass filter, a band pass filter, and an amplifier can be used as the wavelength equalizer 103.

Therefore, the difference between the output amplitude in the case where the mark or space is a signal with a high frequency, such as the 2Tw signal, and the output amplitude in the case where the mark or space is a signal with a low frequency, such as 8Tw, that is, the inclination of the characteristic curve increases with the decrease in the minimum mark length. Accordingly, the difference between the output amplitude at the frequency of the 4Tw signal and the output amplitude at the frequency of the 8Tw signal also increases.

Thus, the reproduction signal characteristic is desirably such that the peak shift of the reproduction frequency characteristic can be prevented, the frequency distribution of noise can be changed, the SNR (signal/noise ratio) of the reproduction signal can be improved and the error rate of the reproduction signal can be improved.

Figure 8:
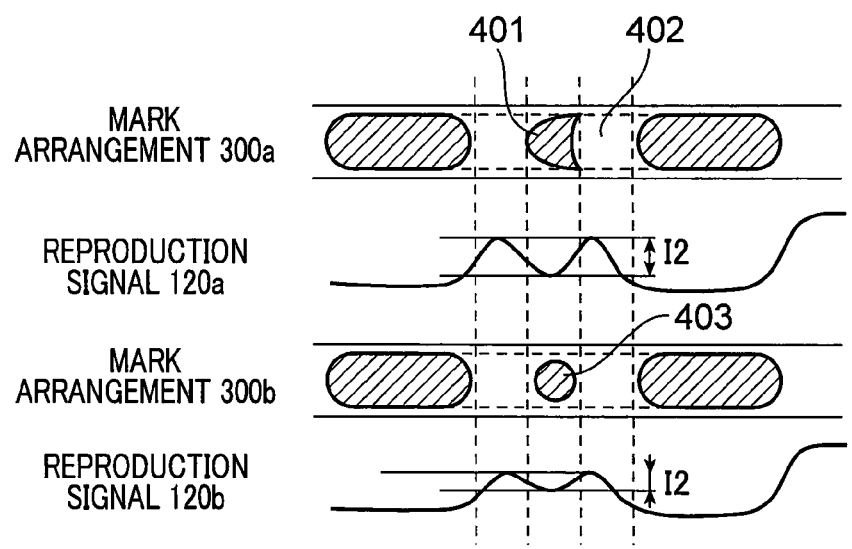
FIG. 8 is a schematic diagram illustrating a reproduction signal waveform in the optical information recording method according to the embodiment of the present invention.

FIG. 8 is a schematic diagram illustrating a reproduction signal waveform in the optical information recording method according to an embodiment of the present invention. FIG. 8 is a schematic diagram illustrating the difference in reproduction signal characteristic caused by the difference in mark shape. The mark arrangements 300a, 300b in FIG. 8 are obtained by scanning the light spot from the left to the right, as shown in the figure, and represent a mark shape after the recording mark has been formed. The reproduction signals 120a, 120b in FIG. 8 are obtained by forming the mark shapes of the mark arrangements 300a, 300b and then reading the marks with the light of an intensity such that the recorded marks are not erased.

The mark arrangement 300a in FIG. 8 shows a typical mark shape on a rewritable disk using phase changes. In the mark arrangement 300a, the smallest 2Tw mark 401 is formed as a leaf-type mark. The 2Tw mark 401 has a leaf-type mark shape because the trailing end of the mark is crystallized from behind by the cooling pulse. The reproduction signal 120a shown in FIG. 8 corresponds to the reproduction of marks of the mark arrangement 300a in FIG. 8. When the 2Tw mark 401 and the 2Tw space 402 are adjacent, as shown in FIG. 8, the smallest reproduction signal amplitude is obtained. In this case, I2 is the minimum amplitude.

Meanwhile, the mark arrangement 300b in FIG. 8 illustrates an example of mark shapes formed on the write-once disk using phase changes. The reproduction signal 120b shown in FIG. 8 corresponds to the reproduction of marks of the mark arrangement 300b shown in FIG. 8. In the write-once disk, marks are formed without recrystallization caused by cooling pulses. Therefore, the 2Tw mark 403 has a round shape and can be formed to be smaller in the width direction than other long marks. When the size of the 2Tw mark 403 is thus less in the width direction than the size of other marks, the minimum amplitude 12 of the reproduction signal 120b shown in FIG. 8 is affected by MTF and becomes less than the minimum amplitude 12 in the reproduction signal 120a shown in FIG. 8. Therefore, the inter-code interference of the 2Tw mark 403 increases and a reproduction peak shift occurs.

Where the peak shift value (Bp) in the reproduction frequency characteristic of the waveform equalizer 103 shown in FIG. 7 is increased, the noise is increased at the same time as the amplitude of the reproduction signal 120 is increased. In particular, where an over-boost state is assumed, the noise is increased in a frequency range higher than the signal band, and in this case the S/N ratio of the reproduction signal 120 can be degraded. Further, in the over-boost state, the inter-code interference on the low-frequency side (4Tw to 8Tw), from among the signal components, is increased and the reproduction is instead degraded. Thus, when the recording marks such as the 2Tw mark are formed to be particularly smaller than other marks, the inter-code interference of 2Tw marks can be compensated by performing the recording compensation of the mark length alone, but the inter-code interference relating to the spaces remains and the reproduction signal characteristic is degraded.

Accordingly, as explained in the above-described embodiment, the pulse edges of the recording pulse signal 125 are changed by the edge variation amounts dTS1, dTS2, and dTE1 corresponding to the mark length, front space length, and rear space length with particular consideration for the 2Tw space during the recording of the marks, and the leading end and trailing end edges of the recording pulse signal 125 are further compensated. As a result, in particular, the inter-code interference that has occurred in the 2Tw spaces can be reduced and the characteristic of the reproduction signal 120 can be improved even at a low boost value.

When data are recorded on an optical recording medium where the recording marks such as those of the mark arrangement 300b shown in FIG. 8 are to be formed, as in a write-once recording medium, the target boost value at the time of recording compensation also depends on the compensation accuracy of such recording compensation. For example, when the recording compensation is performed at a compensation accuracy of about Tw/16, it is desirable that the recording be performed by increasing the boost value by about 1 dB to 2 dB. Further, a recording operation including space compensation may be also performed as long as the recording is initially performed without space compensation during the test writing, and the reproduction signal characteristic such as an error rate does not meet the reference value.

Further, it is also possible to perform the first test writing with a code sequence in which the maximum mark length is removed in advance from the signal that will be recorded, create a recording compensation table of mark lengths that are equal to or greater than 3Tw, then perform the second test writing with a code sequence including the 2Tw signal, and create a recording compensation table including the 2Tw mark length. When the reproduction signal amplitude is extremely small as in the reproduction signal 120b in FIG. 8, where the recording mark position of the 2Tw signal is not correct, the positions of marks and spaces that are equal to or greater than 3Tw in length can be difficult to match accurately. When a signal with an exceedingly large inter-code interference, such as described hereinabove, is reproduced, the marks with a code length equal to or greater than 3Tw are initially recorded, an accurate recording compensation is performed with respect to the edge positions of the marks and spaces with a length equal to or greater than 3Tw, then the signal including the 2Tw signal is recorded, and the recording positions of 2Tw marks and spaces are compensated. As a result, information can be recorded more accurately and with good efficiency and quality of the reproduction signal can be increased.

Further, when a signal with a code length equal to or greater than 3Tw is recorded, as described hereinabove, recording compensation may be performed by lowering the boost value of the reproduction equalizer by 1 dB to 2 dB with respect to that during the recording of the usual recording code sequence including the 2Tw signal. In this case, since the 2Tw signal is not included, the amplitude of the reproduction signal is comparatively large and the generation of inter-code interference is relaxed. Therefore, a signal with a small edge shift can be reproduced by adjusting the edge positions of marks with a large mark length by a boost value somewhat lower than the usual boost value.

In the present embodiment, an example is explained in which the recording power is modulated by three laser power levels, but it goes without saying that a similar effect can be also obtained when the modulation is performed by four laser power levels that further include a cooling pulse having a power level different from the bottom power in the intermediate pulse.

Thus, the recording pulse sequence can be modulated by switching the intensity of laser beam between three or more values of power.

The error rate during reproduction of the recorded signals is at a level suitable for practical use, provided that the symbol error rate is equal to or lower than $4.2\times10^{-3}$.

Figure 9:
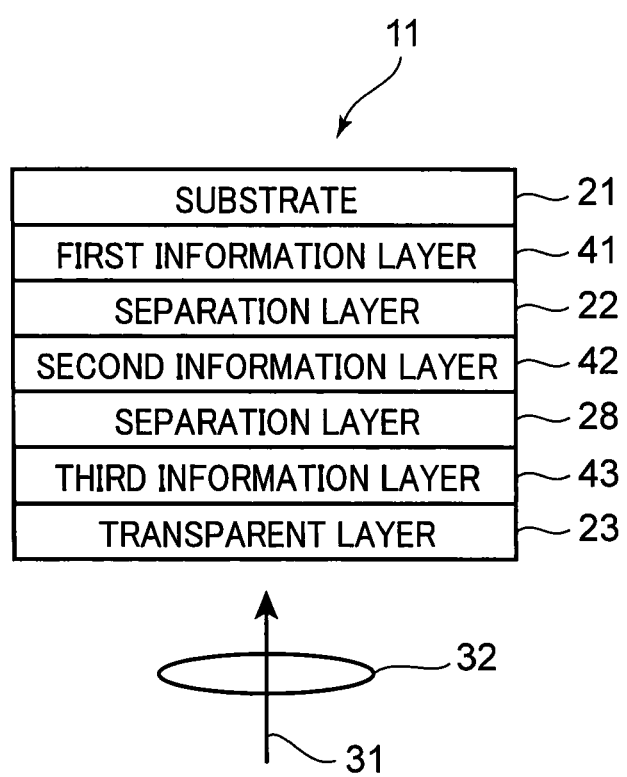
FIG. 9 is a partial cross-sectional view illustrating an optical information recording medium according to the embodiment of the present invention.

An example of the optical information recording medium according to the embodiment of the present invention will be described below. FIG. 9 is a partial cross-sectional view illustrating an optical information recording medium 11 according to the embodiment of the invention. The optical information recording medium 11 is, for example, a triple-layer multilayer optical recording medium suitable for recording and reproducing information by irradiation with a laser light 31 condensed by an objective lens 32.

Where the wavelength $\lambda$, of the laser light 31 is small, a small-diameter spot can be converged by the objective lens 32, but where the wavelength $\lambda$, is too small, light absorption of the laser light 31 by a transparent layer 23 or the like increases. Therefore, it is preferred that the wavelength $\lambda$ of the laser light 31 be within a range of 350 nm to 450 nm.

The optical information recording medium 11 is provided with three information layers, namely, a first information layer 41, a second information layer 42, and a third information layer 43 laminated in the order of description, with separation layers 22, 28 being interposed therebetween, and the transparent layer 23 in the order of description on a substrate 21.

Information is recorded on the optical information recording medium 11 and reproduced therefrom by converging the laser light 31 from the transparent layer 23 side on each information layer by the objective lens 32.

In the optical information recording medium 11, the laser light reaching the information layer that is on the side closer to the substrate 21 than the third information layer 43 and the reflected light therefrom are attenuated by transmission through the information layer on the incident side of the laser light 31 with respect to this information layer. As a result, it is required that the first information layer 41 and the second information layer 42 have a high recording density and a high reflectance and that the second information layer 42 and the third information layer 43 have a high transmittance.

The substrate 21 has a round disk-like shape and is used to hold the layers from the first information layer 41 to the transparent layer 23. A guide groove for guiding the laser light 31 may be formed on the surface of the substrate 21 on the first information layer 41 side. It is preferred that the surface of the substrate 21 on the side opposite that of the first information layer 41 be smooth. Examples of materials suitable for the substrate 21 include polycarbonate resins, poly(methyl methacrylate) resins, polyolefin resins, norbornene resins, glass, and appropriate combinations thereof. Polycarbonate resins are particularly preferred as materials for the substrate 21 because they excel in transfer ability and productivity and have a low cost.

The separation layer 22 and the separation layer 28 are provided to distinguish respective focus positions of the first information layer 41, the second information layer 42 and the third information layer 43 of the optical information recording medium 11. It is desirable that the thickness of the separation layer 22 and the separation layer 28 be equal to or larger than the focal depth determined by the numerical aperture NA of the objective lens 32 and the wavelength $\lambda$, of the laser light 31. Meanwhile, where the thickness of the separation layer 22 and the separation layer 28 is too larger, the distance between the first information layer 41 and the incidence plane of the laser light 31 on the optical information recording medium 11 increases and coma aberration occurring when the optical information recording medium 11 is tilted also increases. Therefore, in such a case, the laser light cannot be correctly converged on the first information layer 41. In this respect, it is preferred that the separation layer 22 and the separation layer 28 be as thin as possible. Assuming that the wavelength $\lambda$, of the laser light 31 is 405 nm and the numerical aperture NA of the objective lens 32 is 0.85, it is preferred that the thickness of the separation layer 22 and the separation layer 28 be within a range of 5 μm to 50 μm.

It is preferred that the separation layer 22 and the separation layer 28 have small absorption ability with respect to the laser light 31. Guide grooves for guiding the laser light 31 may be formed on the surfaces of the separation layer 22 and the separation layer 28 on the side irradiated by the laser light 31. Examples of materials suitable for the separation layer 22 and the separation layer 28 include polycarbonate resins, poly(methyl methacrylate) resins, polyolefin resins, norbornene resins, UV-curable resins, slow-acting thermosetting resins, glass, and appropriate combinations thereof.

The transparent layer 23 is on the side of the third information layer 43 which is the incidence side of the laser light 31 and protects the third information layer 43. It is preferred that the transparent layer 23 have low absorption ability with respect to the laser light 31. Examples of materials suitable for the transparent layer 23 include polycarbonate resins, poly(methyl methacrylate) resins, polyolefin resins, norbornene resins, UV-curable resins, slow-acting thermosetting resins, glass, and appropriate combinations thereof. Sheets constituted by those materials may be also used for the transparent layer 23.

Where the thickness of the transparent layer 23 is too small, the function of protecting the third information layer 43 cannot be demonstrated. Where the thickness of the transparent layer 23 is too large, the distance from the surface of the optical information recording medium 11 on the incidence side of the laser light 31 to the first information layer 41 increases and coma aberration occurring when the optical information recording medium 11 is inclined also increases, in the same manner as in the case of the separation layer 22 and the separation layer 28. As a result, the light cannot be accurately converged on the first information layer 41. Assuming that the numerical aperture NA of the objective lens 32 is 0.85, it is preferred that the thickness of the transparent layer 23 be within a range of 5 μm to 150 μm, more preferably within a range of 40 μm to 110 μm.

Figure 10:
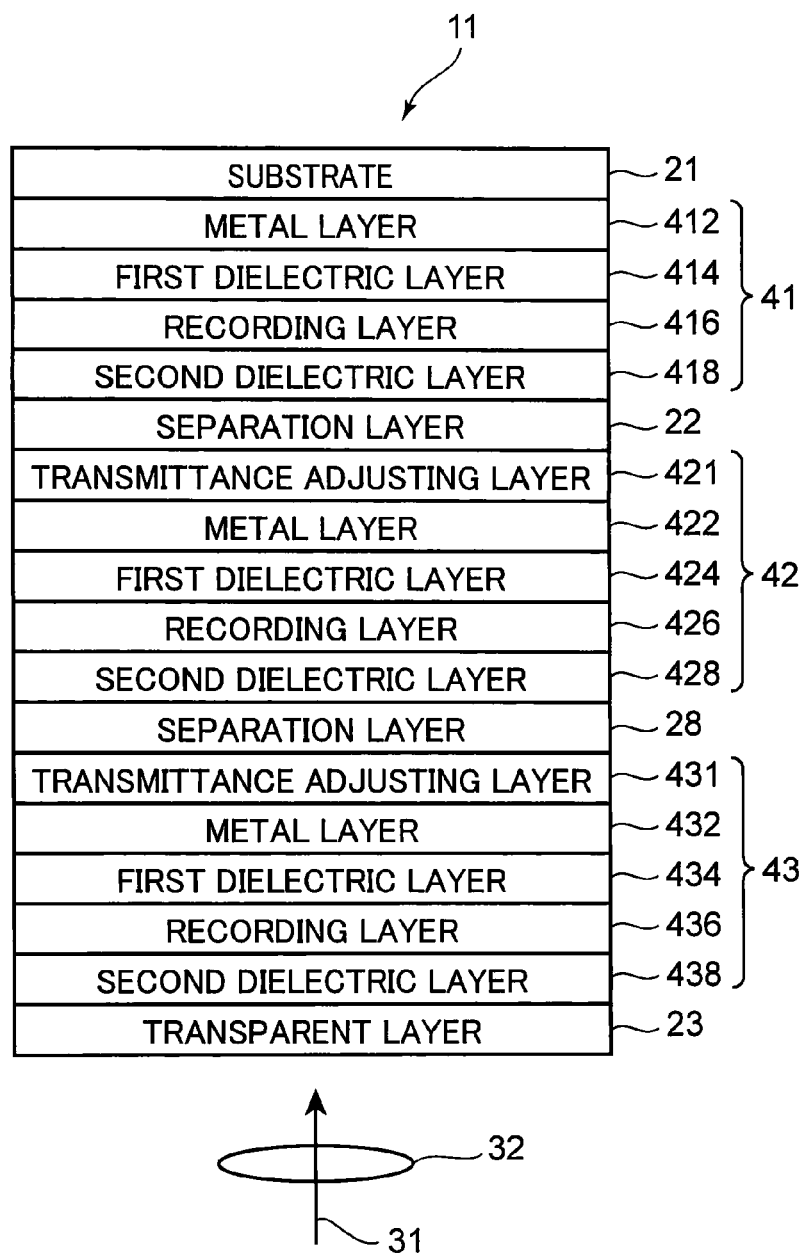
FIG. 10 is a partial cross-sectional view illustrating in greater detail each information layer of the optical information recording medium according to the embodiment of the present invention.

FIG. 10 is a partial cross-sectional view illustrating in greater detail each information layer of the optical information recording medium 11 according to the embodiment of the present invention.

As shown in FIG. 10, in the first information layer 41, a metal layer 412, a first dielectric layer 414, a recording layer 416, and a second dielectric layer 418 are provided in the order of description from the side close to the substrate 21. If necessary, a metal layer-side interface layer 413 may be provided between the metal layer 412 and the first dielectric layer 414, a first interface layer 415 may be provided between the first dielectric layer 414 and the recording layer 416, and a second interface layer 417 may be provided between the second dielectric layer 418 and the recording layer 416. The metal layer-side interface layer 413, the first interface layer 415, and the second interface layer 417 are omitted in the figure.

Likewise, in the second information layer 42, a transmittance adjusting layer 421, a metal layer 422, a first dielectric layer 424, a recording layer 426, and a second dielectric layer 428 are provided in the order of description from the side close to the substrate 21. If necessary, a metal layer-side interface layer 423 may be provided between the metal layer 422 and the first dielectric layer 424, a first interface layer 425 may be provided between the first dielectric layer 424 and the recording layer 426, and a second interface layer 427 may be provided between the second dielectric layer 428 and the recording layer 426. The metal layer-side interface layer 423, the first interface layer 425, and the second interface layer 427 are omitted in the figure.

Likewise, in the third information layer 43, a transmittance adjusting layer 431, a metal layer 432, a first dielectric layer 434, a recording layer 436, and a second dielectric layer 438 are provided in the order of description from the side close to the substrate 21. If necessary, a metal layer-side interface layer 433 may be provided between the metal layer 432 and the first dielectric layer 434, a first interface layer 435 may be provided between the first dielectric layer 434 and the recording layer 436, and a second interface layer 437 may be provided between the second dielectric layer 438 and the recording layer 436. The metal layer-side interface layer 433, the first interface layer 435, and the second interface layer 437 are omitted in the figure.

Each layer constituting the first information layer 41 will be explained below.

The recording layer 416 is a layer in which a reversible phase change between a crystalline phase and an amorphous phase is induced by irradiation with the laser light 31. A material including any of (Ge—Sn)Te, GeTe—$Sb_2Te_3$, (Ge—Sn)Te—$Sb_2Te_3$, GeTe—$Bi_2Te_3$, (Ge—Sn)Te—$Bi_2Te_3$, GeTe—$(Sb—Bi)_2Te_3$, (Ge—Sn)Te—$(Sb—Bi)_2Te_3$, GeTe—$(Bi—In)_2Te_3$, (Ge—Sn)Te—$(Bi—In)_2Te_3$, Sb—Te, Sb—Ge, (Gb—Te)—Ge, Sb—In, (Sb—Te)—In, Sb—Ga, and (Sb—Te)—Ga can be used as the material for the recording layer 416. The recording layer 416 is preferred such that the amorphous phase can be easily changed into the crystalline phase under laser light irradiation during recording and that the amorphous phase does not change into the crystalline phase when no irradiation with the laser light is performed.

Where the thickness of the recording layer 416 is too small, sufficient reflectance, reflectance variation, and erasing efficiency cannot be obtained. Further, where the thickness of the recording layer 416 is too large, thermal capacity becomes large and therefore the recording density decreases. Therefore, the thickness of the recording layer 416 is preferably within a range of 5 nm to 15 nm, more preferably within a range of 8 nm to 12 nm.

The metal layer 412 has an optical function of increasing the quantity of light absorbed by the recording layer 416 and a thermal function of inducing the diffusion of heat generated in the recording layer 416. A material including at least one element selected from among Ag, Au, Cu, and Al can be used for the metal layer 412. For example, alloys such as Ag—Cu, Ag—Ga—Cu, Ag—Pd—Cu, Ag—Nd—Au, AlNi, AlCr, Au—Cr, and Ag—In can be used as the material for the metal layer 412. An Ag alloy is particularly preferred as the material for the metal layer 412 because of a high thermal conductivity. The larger is the thickness of the metal layer 412, the stronger is the thermal diffusion function. However, where the thickness of the metal layer 412 is too large, the thermal diffusion function becomes too strong and the recording sensitivity of the recording layer 416 decreases. For this reason, it is preferred that the thickness of the metal layer 412 be within a range of 30 nm to 200 nm, more preferably 70 nm to 140 nm.

The first dielectric layer 414 is located between the recording layer 416 and the metal layer 412 and has a thermal function of adjusting thermal diffusion from the recording layer 416 to the metal layer 412 and an optical function of adjusting the reflectance and absorbance. For example, oxides such as $ZrO_2$, $HfO_2$, ZnO, $SiO_2$, $SnO_2$, $Cr_2O_3$, $TiO_2$, $In_2O_3$, $Ga_2O_3$, $Y_2O_3$, $CeO_2$, and $DyO_2$, sulfides such as ZnS and CdS, carbides such as SiC can be used individually or in mixtures as the material of the first dielectric layer 414. Examples of suitable mixtures include $ZrO_2$—$SiO_2$, $ZrO_2$—$SiO_2$—$Cr_2O_3$, $ZrO_2$—$SiO_2$—$Ga_2O_3$, $HfO_2$—$SiO_2$—$Cr_2O_3$, $ZrO_2$—$SiO_2$—$In_2O_3$, ZnS—$SiO_2$, and $SnO_2$—SiC. In particular, ZnS—$SiO_2$ excels as the material of the first dielectric layer 414. This is because, ZnS—$SiO_2$ has a high film formation speed, good transparency and good mechanical properties and wetting resistance.

Where the thickness of the first dielectric layer 414 is too large, the cooling effect of the metal layer 412 is weakened and thermal diffusion from the recording layer 416 decreases. As a result, the transition to the amorphous state is unlikely to occur. Further, where the thickness of the first dielectric layer 414 is too small, the cooling effect of the metal layer 412 becomes strong, thermal diffusion from the recording layer 416 increases and the sensitivity drops. Accordingly, the thickness of the first dielectric layer 414 is preferably within a range of 2 nm to 40 nm, more preferably within a range of 8 nm to 30 nm.

The metal layer-side interface layer 413 acts to prevent corrosion or fracture of the metal layer 412 that can be caused by the material of the first dielectric layer 414. More specifically, when a material including silver (Ag) is used for the metal layer 412 and a material (for example, ZnS—$SiO_2$) including sulfur (S) is used for the first dielectric layer 414, the metal layer-side interface layer 413 prevents corrosion caused by the reaction of Ag with S.

Metals other than Ag, for example, Al or Al alloys, can be used as the material for the metal layer-side interface layer 413.

Dielectric materials including no sulfur (S), for example, oxides such as $ZrO_2$, $HfO_2$, ZnO, $SiO_2$, $SnO_2$, $Cr_2O_3$, $TiO_2$, $In_2O_3$, $Ga_2O_3$, $Y_2O_3$, $CeO_2$, and $DyO_2$, and carbides such as SiC can be used individually or in mixtures as the material of the metal layer-side interface layer 413. Examples of suitable mixtures include $ZrO_2$—$SiO_2$, $ZrO_2$—$SiO_2$—$Cr_2O_2$, $ZrO_2$—$SiO_2$—$Ga_2O_2$, $HfO_2$—$SiO_2$—$Cr_2O_3$, $ZrO_2$—$SiO_2$—$In_2O_3$, and $SnO_2$—SiC. Furthermore, carbon (C) can be also used as the material of the metal layer-side interface layer 413.

Where the thickness of the metal layer-side interface layer 413 is too large, thermal and optical actions of the first dielectric layer 414 are inhibited. Where the thickness of the metal layer-side interface layer 413 is too small, the function of preventing the metal layer 412 from corrosion and fracture is degraded. Therefore, it is preferred that the thickness of the metal layer-side interface layer 413 be within a range of 1 nm to 100 nm, more preferably within a range of 5 nm to 40 nm.

The first interface layer 415 acts to prevent the movement of matter occurring between the first dielectric layer 414 and the recording layer 416 due to repeated recording. It is preferred that the first interface layer 415 be prepared from a material that has good adhesion to the recording layer 416 and a melting point such that the first interface layer is not melted during recording. For example, oxides such as $ZrO_2$, $HfO_2$, ZnO, $SiO_2$, $SnO_2$, $Cr_2O_3$, $TiO_2$, $In_2O_3$, $Ga_2O_3$, $Y_2O_3$, $CeO_2$, and $DyO_2$, sulfides such as ZnS and CdS, carbides such as SiC can be used individually or in mixtures as the material of the first interface layer 415. Examples of suitable mixtures include $ZrO_2$—$SiO_2$, $ZrO_2$—$SiO_2$—$Cr_2O_3$, $ZrO_2$—$SiO_2$—$Ga_2O_3$, $HfO_2$—$SiO_3$—$Cr_2O_3$, $ZrO_2$—$SiO_2$—$In_2O_3$, ZnS—$SiO_2$, and $SnO_2$—SiC. Furthermore, carbon (C) can be also used as the material of the first interface layer 415. In particular, $Ga_2O_3$, ZnO, and $In_2O_3$ are preferred as the materials of the first interface layer 415. This is because $Ga_2O_3$, ZnO, and $In_2O_3$ demonstrate good adhesion to the recording layer 416.

Where the thickness of the first interface layer 415 is too small, the interface layer effect is not demonstrated. Where the thickness of the first interface layer 415 is too large, thermal and optical actions of the first dielectric layer 414 are inhibited. Therefore, the thickness of the first interface layer 415 is preferably within a range of 0.3 nm to 15 nm, more preferably within a range of 1 nm to 8 nm.

The second dielectric layer 418 is located on the laser light incidence side with respect to the recording layer 416 and has a function of preventing the recording layer 416 from corrosion and deformation and an optical function of adjusting the reflectance and absorbance. Further, a material similar to that of the first dielectric layer 414 can be used for the second dielectric layer 418. In particular, ZnS—$SiO_2$ excels as a material for the second dielectric layer 418. This is because, ZnS—$SiO_2$ has a high film formation speed, good transparency, and good mechanical properties and wetting resistance.

Where the thickness of the second dielectric layer 418 is too small, the function of preventing the recording layer 416 from corrosion and deformation is degraded. The thickness of the second dielectric layer 418 can be accurately determined by calculations based on a matrix method, so as to satisfy the condition of increasing the variation in the quantity of reflected light between the amorphous state and crystalline state of the recording layer 416. The thickness of the second dielectric layer 418 is preferably within a range of 20 nm to 80 nm.

Similarly to the first interface layer 415, the second interface layer 417 acts to prevent the movement of matter occurring between the second dielectric layer 418 and the recording layer 416 due to repeated recording. Therefore, it is preferred that a material demonstrating the performance similar to that of the first interface layer 415 be used for the second interface layer 417.

Similarly to the first interface layer 415, the thickness of the second interface layer 417 is preferably within a range of 0.3 nm to 15 nm, more preferably within a range of 1 nm to 8 nm.

The first information layer 41 is constituted by the metal layer 412, first dielectric layer 414, recording layer 416, and second dielectric layer 418. If necessary, the metal layer-side interface layer 413, first interface layer 415, and second interface layer 417 can be added thereto.

Each layer constituting the second information layer 42 will be explained below.

A material similar to that of the recording layer 416 of the first information layer 41 can be used for the recording layer 426. The thickness of the recording layer 426 is preferably equal to or less than 10 nm, more preferably within a range of 4 nm to 8 nm in order to increase the transmittance of the second information layer 42.

The metal layer 422 has a function similar to that of the metal layer 412 of the first information layer 41. Thus, the metal layer 422 has an optical function of increasing the quantity of light absorbed by the recording layer 426 and a thermal function of causing the diffusion of heat generated in the recording layer 426. Therefore, a material similar to that of the metal layer 412 of the first information layer 41 can be used for the metal layer 422. In particular, since Ag alloys have a high thermal conductivity, they are preferred as materials for the metal layer 422.

In order to increase the transmittance of the second information layer 42, it is preferred that the thickness of the metal layer 422 be equal to or less than 20 nm, more preferably within a range of 3 nm to 14 nm. Where the thickness of the metal layer 422 is within a range of 3 nm to 14 nm, sufficient optical and thermal functions of the metal layer 422 are demonstrated.

The first dielectric layer 424 has functions similar to those of the first dielectric layer 414 of the first information layer 41. Thus, the first dielectric layer 424 has a thermal function of adjusting the thermal diffusion from the recording layer 426 to the metal layer 422 and an optical function of adjusting the reflectance and absorbance. Therefore, a material similar to that of the first dielectric layer 414 of the first information layer 41 can be used for the first dielectric layer 424.

The thickness of the first dielectric layer 424 is preferably within a range of 1 nm to 40 nm, more preferably within a range of 4 nm to 30 nm to ensure sufficient optical and thermal functions.

The second dielectric layer 428 has functions similar to those of the second dielectric layer 418 of the first information layer 41. Thus, the second dielectric layer 428 has a function of preventing the recording layer 426 from corrosion and deformation and an optical function of adjusting the reflectance and absorbance. Therefore, a material similar to that of the second dielectric layer 418 of the first information layer 41 can be used for the second dielectric layer 428. The thickness of the second dielectric layer 428 can be accurately determined by calculations based on a matrix method, so as to satisfy the condition of increasing the variation in the quantity of reflected light between the amorphous state and crystalline state of the recording layer 426.

The transmittance adjusting layer 421 is constituted by a dielectric and has a function of adjusting the transmittance of the second information layer 42. The transmittance adjusting layer 421 makes it possible to increase both the transmittance Tc (%) of the second information layer 42 in the case where the recording layer 426 is in a crystalline phase and also the transmittance Ta (%) of the second information layer 42 in the case where the recording layer 426 is in an amorphous phase.

Oxides such as $TiO_2$, $ZrO_2$, $HfO_2$, ZnO, $Nb_2O_5$, $Ta_2O_5$, $Al_2O_3$, $SiO_2$, $Cr_2O_3$, $CeO_2$, $Ga_2O_3$ and $Bi_2O_3$, nitrides such as Ti—N, Zr—N, Nb—N, Ge—N, Cr—N, and Al—N, and sulfides such as ZnS can be used individually or in mixtures as the material of the transmittance adjusting layer 421. In order to increase the transmittance Tc and the transmittance Ta, it is preferred that the refractive index nt and the attenuation factor kt of the transmittance adjusting layer 421 satisfy the following conditions: $nt \geq 2.4$ and $kt \leq 0.1$. For this reason, it is preferred that $TiO_2$ or a material including $TiO_2$ be used, from among the abovementioned materials, for the transmittance adjusting layer 421. Those materials have a large refractive index nt (nt=2.6 to 2.8) and a small attenuation factor kt (kt=0.0 to 0.1). Therefore, the transmittance adjusting layer 421 formed by using these materials effectively increases the transmittance of the second information layer 42.

When the thickness of the transmittance adjusting layer 421 is about $\lambda/8$ nt (here, $\lambda$ is the wavelength of the laser light 31 and nt is the refractive index of the material of the transmittance adjusting layer 421), a strong effect of increasing the transmittance Tc and the transmittance Ta is demonstrated. Assuming that the wavelength $\lambda$ of the laser light 31 is 405 nm and the refractive index nt of the material of the transmittance adjusting layer 421 is 2.6, it is preferred that the thickness of the refractive index of the material of the transmittance adjusting layer 421 be within a range of 5 nm to 36 nm (other conditions such as the reflectance are also taken into account).

The metal layer-side interface layer 423, the first interface layer 425, and the second interface layer 427 have functions similar to those of the metal layer-side interface layer 413, the first interface layer 415, and the second interface layer 417 of the first information layer 41, respectively. Further, the metal layer-side interface layer 423, the first interface layer 425, and the second interface layer 427 can be formed using materials similar to those of the metal layer-side interface layer 413, the first interface layer 415, and the second interface layer 417 of the first information layer 41, respectively.

Each layer constituting the third information layer 43 will be explained below.

The layers constituting the third information layer 43 have functions similar to the corresponding layers constituting the second information layer 42. Each layer constituting the third information layer 43 can be formed by using a material similar to that of the corresponding layer constituting the second information layer 42.

The optical information recording medium 11 can be manufactured by the method described below.

First, the first information layer 41 is laminated on the substrate 21 with a thickness of, for example, 1.1 mm. The first information layer 41 is constituted by a multilayer film, and the layers of the first information layer 41 can be successively formed by sputtering. Depending on the material of the substrate 21, the substrate 21 may have high moisture absorption ability. Therefore, if necessary, a substrate annealing process may be implemented to remove moisture prior to sputtering.

The layers of the first information layer 41 can be formed by sputtering a sputtering target from a material constituting each layer in a rare gas atmosphere of Ar gas, Kr gas, or Xe gas or a mixed gas atmosphere in which the rare gas is mixed with a reaction gas (at least one gas selected from nitrogen gas and oxygen gas). A DC sputtering method and a RF sputtering method can be selected, as necessary, as the sputtering method. The DC sputtering method is usually preferred since the film formation rate can be increased, but materials with a low electric conductivity such as dielectric materials sometimes cannot be sputtered by the DC sputtering method. Therefore, the layers including materials with a low electric conductivity are sputtered by the RF sputtering method. Materials with a high electric conductivity, even if they are dielectric materials, or materials with an electric conductivity intentionally increased at the sputtering target fabrication stage can be sputtered by the DC sputtering method or pulse DC sputtering method.

The compositions of the layers formed by sputtering sometimes do not perfectly match the composition of the original sputtering targets. For example, in the case of oxides, the sputtering easily causes oxygen deficiency. In such a case, the oxygen deficiency can be compensated by using oxygen gas as the reaction gas. The composition of the sputtering target is determined such that the film formed by sputtering has the desired composition. The composition of the sputtering targets and the films obtained by sputtering can be confirmed, for example, by analysis with an X ray microanalyzer.

More specifically, in the manufacture of the optical information recording medium 11, first, the metal layer 412 is formed on the substrate 21. The metal layer 412 can be formed by DC sputtering a sputtering target constituted by a metal or an alloy constituting the metal layer 412 in a rare gas atmosphere or a mixed gas atmosphere of rare gas and reaction gas.

Then, if necessary, the metal layer-side interface layer 413 is formed on the metal layer 412. The metal layer-side interface layer 413 can be formed by sputtering a sputtering target from a material constituting the metal layer-side interface layer 413 in a rare gas atmosphere or a mixed gas atmosphere of rare gas and reaction gas. When the material of the metal layer-side interface layer 413 is a material with a high electric conductivity such as a metal, the DC sputtering method may be used, and when the material of the metal layer-side interface layer is a material with a low electric conductivity such as an oxide, the RF sputtering method may be used.

Then, the first dielectric layer 414 is formed on the metal layer-side interface layer 413 or the metal layer 412. The first dielectric layer 414 can be formed by sputtering (mainly by the RF sputtering method) a sputtering target from a material constituting the first dielectric layer 414 in a rare gas atmosphere or a mixed gas atmosphere of rare gas and reaction gas. The RF sputtering method is used because the material constituting the first dielectric layer 414 is most often a material with a low electric conductivity and the DC sputtering method is not suitable.

Then, if necessary, the first interface layer 415 is formed on the first dielectric layer 414. The first interface layer 415 can be formed by sputtering (mainly by the RF sputtering method) a sputtering target from a material constituting the first interface layer 415 in a rare gas atmosphere or a mixed gas atmosphere of rare gas and reaction gas.

Then, the recording layer 416 is formed on the first interface layer 415 or the first dielectric layer 414. The recording layer 416 can be formed by sputtering (mainly by the DC sputtering method) a sputtering target from a material constituting the recording layer 416 in a rare gas atmosphere.

Then, if necessary, the second interface layer 417 is formed on the recording layer 416. The second interface layer 417 can be formed by sputtering (mainly by the RF sputtering method) a sputtering target from a material constituting the second interface layer 417 in a rare gas atmosphere or a mixed gas atmosphere of rare gas and reaction gas.

Then, the second dielectric layer 418 is formed on the second interface layer 417 or the recording layer 416. The second dielectric layer 418 can be formed by sputtering (mainly by the RF sputtering method) a sputtering target from a material constituting the second dielectric layer 418 in a rare gas atmosphere or a mixed gas atmosphere of rare gas and reaction gas.

The first information layer 41 is thus laminated on the substrate 21, and the separation layer 22 is thereafter formed on the first information layer 41. The separation layer 22 can be formed in the following manner. First, a resin curable by ultraviolet radiation (for example, an acrylic resin or an epoxy resin) or a slow-acting thermosetting resin is coated on the first information layer 41. Then, the entire body is rotated, the resin is uniformly spread (spin coating), and the resin is thereafter cured. When a guide groove for the laser light 31 is provided in the separation layer 22, first, a substrate (mold) having the groove formed therein is brought into intimate contact with the uncured resin. In this state, the entire body is rotated to ensure spin coating, the resin is cured, and the substrate (mold) is thereafter separated. The guide groove thus can be formed in the separation layer 22.

In the as-deposited state, the recording layer 416 of the first information layer 41 is usually in the amorphous state. Therefore, an initialization step of crystallizing the recording layer 416 may be performed, as necessary, by laser beam irradiation or the like.

The second information layer 42 is then formed on the separation layer 22.

More specifically, the transmittance adjusting layer 421 is formed on the separation layer 22. The transmittance adjusting layer 421 can be formed by sputtering (RF sputtering method or DC sputtering method) a sputtering target from a material constituting the transmittance adjusting layer 421 in a rare gas atmosphere or a mixed gas atmosphere of rare gas and reaction gas.

The metal layer 422 is then formed on the transmittance adjusting layer 421. The metal layer 422 can be formed by the same method as that used to form the metal layer 412 of the first information layer 41.

The metal layer-side interface layer 423 is then formed, if necessary, on the metal layer 422. The metal layer-side interface layer 423 can be formed by the same method as that used to form the metal layer-side interface layer 413 of the first information layer 41.

Then, the first dielectric layer 424 is formed on the metal layer-side interface layer 423 or the metal layer 422. The first dielectric layer 424 can be formed by the same method as that used to form the first dielectric layer 414 of the first information layer 41.

Then, the first interface layer 425 is formed, if necessary, on the first dielectric layer 424. The first interface layer 425 can be formed by the same method as that used to form the first interface layer 415 of the first information layer 41.

Then, the recording layer 426 is formed on the first interface layer 425 or the first dielectric layer 424. The recording layer 426 can be formed by the same method as that used to form the recording layer 416 of the first information layer 41.

Then, the second interface layer 427 is formed, if necessary, on the recording layer 426. The second interface layer 427 can be formed by the same method as that used to form the second interface layer 417 of the first information layer 41.

Then, the second dielectric layer 428 is formed on the second interface layer 427 or the recording layer 426. The second dielectric layer 428 can be formed by the same method as that used to form the second dielectric layer 418 of the first information layer 41.

The second information layer 42 is thus laminated on the separation layer 22, and then the separation layer 28 is formed on the second information layer 42. The separation layer 28 can be formed by a method similar to that used to form the separation layer 22.

After the second dielectric layer 428 has been formed or after the separation layer 28 has been formed, an initialization step of crystallizing the recording layer 426 may be performed, if necessary, by laser beam irradiation or the like.

The third information layer 43 is then laminated on the separation layer 28.

More specifically, the transmittance adjusting layer 431, the metal layer 432, the first dielectric layer 434, the recording layer 436, and the second dielectric layer 438 are successively formed on the separation layer 28. In this case, if necessary, the metal layer-side interface layer 433 may be formed between the metal layer 432 and the first dielectric layer 434, the first interface layer 435 may be formed between the first dielectric layer 434 and the recording layer 436, and the second interface layer 437 may be formed between the second dielectric layer 438 and the recording layer 436. The layers of the third recording layer 43 can be formed by the same methods as the layers of the second information layer 42.

The transparent layer 23 is thus formed on the third information layer 43 after the third information layer 43 has been laminated on the separation layer 28.

The transparent layer 23 is formed in the below-described manner. First, a resin curable by ultraviolet radiation (for example, an acrylic resin or an epoxy resin) or a slow-acting thermosetting resin is applied to and spin coated on the third information layer 43, followed by curing. The transparent layer 23 may be also formed by using a disk-shaped polycarbonate resin, poly(methyl methacrylate) resin, polyolefin resin, or norbornene resin. The transparent layer 23 may be also formed by using a disk-like plate or sheet constituted by glass or the like. In this case, the transparent layer 23 can be formed by applying a resin curable by ultraviolet radiation or a slow-acting thermosetting resin to the third information layer 43, bringing the plate or sheet into intimate contact with the coated resin, spin coating, and then curing the curable resin. As another forming method, a pressure-sensitive adhesive resin is uniformly applied in advance to a plate or sheet and then the plate or sheet is brought into intimate contact with the second dielectric layer 438.

An initialization step of crystallizing the recording layer 436 by laser light irradiation or the like may be performed, if necessary, after the second dielectric layer 438 has been formed or after the transparent layer 23 has been formed.

The optical information recording medium 11 can be manufactured in the above-described manner. In the present embodiment, sputtering is used as a method for forming the layers constituting the information layers, but such a process is not limiting, and a vacuum vapor deposition method, an ion plating method, or a MBE (Molecular Beam Epitaxy) can be also used.

In the present embodiment, the case is described in which the optical information recording medium 11 has three information layers, but a method similar to that described hereinabove can be also used when the number of information layers is two or when the number of information layers is four or more.

Further, in the present embodiment, the recording layers 416, 426, 436 are the layers in which a reversible phase change is induced between the crystalline phase and the amorphous phase, and the optical information recording medium 11 is a rewritable optical recording medium. However, the optical information recording medium 11 may also be a write-once optical recording medium. In this case, the recording layers 416, 426, 436 may be the layers in which irreversible changes are induced. For example, Te—O—Pd or the like can be used as a material for a layer in which irreversible changes are induced. In this case, the thickness of the recording layer 416 of the first information layer 41 is preferably within a range of 10 nm to 50 nm, and the thicknesses of the recording layer 426 of the second information layer 42 and the recording layer 436 of the third information layer 43 are preferably within a range of 6 nm to 30 nm.

In both the rewritable optical recording medium and the write-once optical recording medium, a metal layer with a high thermal conductivity is used with the object of performing efficient cooling during recording, and it is preferred that the metal layer be increased in thickness to inhibit thermal interference. However, the metal layer cannot be made too thin to increase the transmittance, the thickness of the metal layer tends to decrease with the transition to the information layer on the laser light irradiation side and the cooling ability thereof tends to decrease.

Example

The present invention will be described below in greater detail by a specific example thereof.

In the example, the inventors fabricated the optical information recording medium 11 shown in FIG. 9 and examined the recording characteristic and reproduction characteristic of the information layers, namely, the first information layer 41, the second information layer 42, and the third information layer 43.

A sample was manufactured in the below-described manner. A polycarbonate substrate (diameter 120 mm, thickness 1.1 mm) having formed therein a guide groove (depth 20 nm, track pitch 0.32 μm) for guiding the laser light 31 was used as the substrate 21.

Then, an Ag—Pd—Cu layer (thickness 80 nm) as the metal layer 412, a $(ZrO_2)_{50}(In_2O_3)_{50}$ layer (thickness 25 nm) as the first dielectric layer 414, a $(GeTe)_{97}(Bi_2Te_3)_3$ layer (thickness 10 nm) as the recording layer 416, a $(ZrO_2)_{50}(Cr_2O_3)_{50}$ layer (thickness 5 nm) as the second interface layer 417 (not shown in the figure), and a $(ZnS)_{80}(SiO_2)_{20}$ layer (thickness 60 nm) as the second dielectric layer 418 were successively laminated by sputtering on the polycarbonate substrate.

The film forming apparatus for sputtering the abovementioned layers was provided with a Ag—Pd—Cu alloy sputtering target for forming the metal layer 412, a $(ZrO_2)_{50}(In_2O_3)_{50}$ sputtering target for forming the first dielectric layer 414, a $(GeTe)_{97}(Bi_2Te_3)_3$ sputtering target for forming the recording layer 416, a $(ZrO_2)_{50}(Cr_2O_3)_{50}$ for forming the second interface layer 417, and a $(ZnS)_{80}(SiO_2)_{20}$ sputtering target for forming the second dielectric layer 418. Each sputtering target had a diameter of 100 mm and a thickness of 6 mm.

The metal layer 412 was formed in an Ar gas atmosphere under a pressure of 0.3 Pa by using a DC power supply and a supplied power of 100 W. The first dielectric layer 414 was formed in an Ar gas atmosphere under a pressure of 0.1 Pa by using a RF power supply and a supplied power of 200 W. The recording layer 416 was formed in an Ar gas atmosphere under a pressure of 0.2 Pa by using a DC power supply and a supplied power of 50 W. The second interface layer 417 was formed in an Ar gas atmosphere under a pressure of 0.1 Pa by using a RF power supply and a supplied power of 200 W. The second dielectric layer 418 was formed in an Ar gas atmosphere under a pressure of 0.1 Pa by using a RF power supply and a supplied power of 400 W.

Then, a resin curable by ultraviolet radiation was applied to the second dielectric layer 418, the substrate having the guide groove (depth 20 nm, track pitch 0.32 μm) formed therein was placed on the resin, brought into intimate contact therewith and rotated. As a result, a uniform resin layer was formed. The resin was then cured and the substrate was removed. As a result, the separation layer 22 with a thickness of 25 μm was obtained in which the guiding groove for guiding the laser light 31 was formed on the second information layer 42 side.

Then, a $TiO_2$ layer (thickness 20 nm) as the transmittance adjusting layer 421, an Ag—Pd—Cu layer (thickness 10 nm) as the metal layer 422, a $(ZrO_2)_{50}(In_2O_3)_{50}$ layer (thickness 15 nm) as the first dielectric layer 424, a $(GeTe)_{96}(Bi_2Te_3)_4$ layer (thickness 7 nm) as the recording layer 426, a $(ZrO_2)_{50}(Cr_2O_3)_{50}$ layer (thickness 5 nm) as the second interface layer 427 (not shown in the figure), and a $(ZnS)_{80}(SiO_2)_{20}$ layer (thickness 40 nm) as the second dielectric layer 428 were successively laminated by sputtering on the separation layer 22.

The film forming apparatus for sputtering the abovementioned layers was provided with a $TiO_2$ sputtering target for forming the transmittance adjusting layer 421, a Ag—Pd—Cu alloy sputtering target for forming the metal layer 422, a $(ZrO_2)_{50}(In_2O_3)_{50}$ sputtering target for forming the first dielectric layer 424, a $(GeTe)_{97}(Bi_2Te_3)_3$ sputtering target for forming the recording layer 426, a $(ZrO_2)_{50}(Cr_2O_3)_{50}$ for forming the second interface layer 427, and a $(ZnS)_{80}(SiO_2)_{20}$ sputtering target for forming the second dielectric layer 428. Each sputtering target had a diameter of 100 mm and a thickness of 6 mm.

The transmittance adjusting layer 421 was formed in a mixed gas atmosphere of Ar and oxygen (the oxygen gas was at a ratio of 3% with respect to the entire atmosphere) under a pressure of 0.3 Pa by using a RF power supply and a supplied power of 400 W. The metal layer 422 was formed in an Ar gas atmosphere under a pressure of 0.3 Pa by using a DC power supply and a supplied power of 100 W. The first dielectric layer 424 was formed in an Ar gas atmosphere under a pressure of 0.1 Pa by using a RF power supply and a supplied power of 200 W. The recording layer 426 was formed in an Ar gas atmosphere under a pressure of 0.2 Pa by using a DC power supply and a supplied power of 50 W. The second interface layer 427 was formed in an Ar gas atmosphere under a pressure of 0.1 Pa by using a RF power supply and a supplied power of 200 W. The second dielectric layer 428 was formed in an Ar gas atmosphere under a pressure of 0.1 Pa by using a RF power supply and a supplied power of 400 W.

Then, a resin curable by ultraviolet radiation was applied to the second dielectric layer 428, the substrate having the guide groove (depth 20 nm, track pitch 0.32 μm) formed therein was placed on the resin, brought into intimate contact therewith and rotated. As a result, a uniform resin layer was formed. The resin was then cured and the substrate was removed. As a result, the separation layer 28 with a thickness of 18 μm was obtained in which the guiding groove for guiding the laser light 31 was formed on the third information layer 43 side.

Then, a $TiO_2$ layer (thickness 30 nm) as the transmittance adjusting layer 431, an Ag—Pd—Cu layer (thickness 8 nm) as the metal layer 432, a $(ZrO_2)_{50}(In_2O_3)_{50}$ layer (thickness 10 nm) as the second dielectric layer 434, a $(GeTe)_{96}(Bi_2Te_3)_4$ layer (thickness 6 nm) as the recording layer 436, a $(ZrO_2)_{50}(Cr_2O_3)_{50}$ layer (thickness 5 nm) as the second interface layer 437 (not shown in the figure), and a $(ZnS)_{80}(SiO_2)_{20}$ layer (thickness 35 nm) as the second dielectric layer 438 were successively laminated by sputtering on the separation layer 28.

The film forming apparatus for sputtering the abovementioned layers was provided with a $TiO_2$ sputtering target for forming the transmittance adjusting layer 431, a Ag—Pd—Cu alloy sputtering target for forming the metal layer 432, a $(ZrO_2)_{50}(In_2O_3)_{50}$ sputtering target for forming the first dielectric layer 434, a $(GeTe)_{96}(Bi_2Te_3)_4$ sputtering target for forming the recording layer 436, a $(ZrO_2)_{50}(Cr_2O_3)_{50}$ for forming the second interface layer 437, and a $(ZnS)_{80}(SiO_2)_{20}$ sputtering target for forming the second dielectric layer 438. Each sputtering target had a diameter of 100 mm and a thickness of 6 mm.

The transmittance adjusting layer 431 was formed in a mixed gas atmosphere of Ar and oxygen (the oxygen gas was at a ratio of 3% with respect to the entire atmosphere) under a pressure of 0.3 Pa by using a RF power supply and a supplied power of 400 W. The metal layer 432 was formed in an Ar gas atmosphere under a pressure of 0.3 Pa by using a DC power supply and a supplied power of 100 W. The first dielectric layer 434 was formed in an Ar gas atmosphere under a pressure of 0.1 Pa by using a RF power supply and a supplied power of 200 W. The recording layer 436 was formed in an Ar gas atmosphere under a pressure of 0.2 Pa by using a DC power supply and a supplied power of 50 W. The second interface layer 437 was formed in an Ar gas atmosphere under a pressure of 0.1 Pa by using a RF power supply and a supplied power of 200 W. The second dielectric layer 438 was formed in an Ar gas atmosphere under a pressure of 0.1 Pa by using a RF power supply and a supplied power of 400 W.

Finally, a resin curable by ultraviolet radiation was applied to the second dielectric layer 438 and rotated to form a uniform resin layer. The resin was cured by irradiation with ultraviolet radiation to form the transparent layer 23 with a thickness of 57 μm. Then, an initialization step was performed to crystallize the recording layer 416, recording layer 426, and recording layer 436 by laser light. A plurality of samples was thus manufactured that differed in the thickness of the recording layer 436 of the third information layer 43 and the thickness of the second dielectric layer 438.

A symbol error rate of each information layer was measured by using the optical recording and reproduction device shown in FIG. 1 with respect to the samples thus obtained. In this case, the recording was implemented by a recording method at a capacity of 33.4 GB per one layer, and the shortest mark length (2T) was 0.112 μm. The linear speed of the sample during recording and measurements was 7.38 m/s. The reproduction signal was subjected to PRML processing with a PR (12221) and a symbol error rate was measured.

In this case, the optical recording and reproduction device determines the pulse edge position of the recording pulse by test writing. During the test writing, the optical recording and reproduction device initially performs recording in a state without space compensation, and only when the symbol error rate does not satisfy a reference value ($4.2 \times 10^{-3}$), the recording operation is performed by gradually increasing the edge variation amount determined by space compensation. When the symbol error rate satisfies the reference value, the optical recording and reproduction device obtains a recording compensation table of edge variation amounts and determines the pulse edge position.

In the present embodiment, the simplified recording compensation tables shown in Tables 5, 6, 7, and 8 hereinabove are used. Values of the recording compensation tables are taken as control parameters, and the variation amounts depending on the front space lengths and rear space lengths of the control parameters are determined by the following 16 indexes (Δ1 to Δ16).

$\Delta 1 = |A1 - A0|$ $\Delta 2 = |A2 - A0|$ $\Delta 3 = |A3 - A0|$ $\Delta 4 = |A1 - A2|$ $\Delta 5 = |B1 - B0|$ $\Delta 6 = |E1 - E0|$ $\Delta 7 = |E2 - E0|$ $\Delta 8 = |E3 - E0|$ $\Delta 9 = |E1 - E2|$ $\Delta 10 = |F1 - F0|$ $\Delta 11 = |I1 - I0|$ $\Delta 12 = |I2 - M0|$ $\Delta 13 = |I3 - I0|$ $\Delta 14 = |I1 - I2|$ $\Delta 15 = |J1 - J0|$ $\Delta 16 = |1 - P0|$ Table 9 shows variation amounts of the control parameter of space compensation when the symbol error rate satisfies the reference value. In the present example, the control parameter is changed in Tw/32 units.

TABLE 9

| VARIATION AMOUNT OF PARAMETER (Tw/32 units) | | FIRST INFORMATION LAYER | SECOND INFORMATION LAYER | THIRD INFORMATION LAYER |
|---|---|---|---|---|
| INDEX | (CORRESPONDING EDGE) | | | |
| Δ1 \|A1-A0\| | dTS1(2T MARK) | 1 | 3 | 4 |
| Δ2 \|A2-A0\| | dTS1(2T MARK) | 1 | 3 | 3 |
| Δ3 \|A3-A0\| | dTS1(2T MARK) | 0 | 0 | 1 |
| Δ4 \|A1-A2\| | dTS1(2T MARK) | 2 | 6 | 7 |
| Δ5 \|B1-B0\| | dTS1(3T MARK) | 1 | 2 | 2 |
| Δ6 \|E1-E0\| | dTS2(2T MARK) | 1 | 3 | 4 |
| Δ7 \|E2-E0\| | dTS2(2T MARK) | 1 | 3 | 3 |
| Δ8 \|E3-E0\| | dTS2(2T MARK) | 0 | 0 | 1 |
| Δ9 \|E1-E2\| | dTS2(2T MARK) | 2 | 6 | 7 |
| Δ10 \|F1-F0\| | dTS2(3T MARK) | 1 | 1 | 1 |
| Δ11 \|I1-I0\| | dTE1(2T MARK) | 1 | 3 | 4 |
| Δ12 \|I2-I0\| | dTE1(2T MARK) | 1 | 2 | 3 |
| Δ13 \|I3-I0\| | dTE1(2T MARK) | 0 | 0 | 1 |
| Δ14 \|I1-I2\| | dTE1(2T MARK) | 2 | 5 | 7 |
| Δ15 \|J1-J0\| | dTE1(3T MARK) | 1 | 1 | 1 |
| Δ16 \|P1-P0\| | dTE2(3T MARK) | 1 | 1 | 1 |

As shown in Table 9, the variation amount of the control parameter for space compensation of the third information layer 43 and the second information layer 42 that are close to the incidence side of the laser light 31 is larger than the variation amount of the control parameter for space compensation of the first information layer 41 that is the farthest from the incidence side of the laser light 31.

In particular, the variation amount of the control parameter relating to the 2T mark increases. This is due to the increase in the effect of thermal interference caused by the presence of a thin metal layer provided to increase the transmittance of the information layer close to the incidence side of the laser light 31 and a decreased cooling rate and also by an exceptionally small minimum mark length (2T) (0.112 μm) resulting from a high-density recording of 33.4 GB.

Further, since the first information layer 41 is not required to have a high transmittance, the metal layer can be made sufficiently thick and the cooling rate can be greatly increased over that of other information layers. As a result, the conditions of the recording pulse will supposedly change significantly. For example, in some cases, good recording can be performed even under the conditions of recording pulses without a bottom power level (Pb) explained with reference to FIG. 3. Thus, where the recording pulse conditions differ significantly, the trend of control parameters changes.

Table 10 shows variation amounts of control parameters for space compensation in the case where a recording pulse without the bottom power level (Pb) is used only in the first information layer 41.

TABLE 10

| VARIATION AMOUNT OF PARAMETER (Tw/32 units) | | FIRST INFORMATION LAYER | SECOND INFORMATION LAYER | THIRD INFORMATION LAYER |
|---|---|---|---|---|
| INDEX | (CORRESPONDING EDGE) | | | |
| Δ1 | \|A1-A0\| | dTS1(2T MARK) | 5 | 3 | 4 |
| Δ2 | \|A2-A0\| | dTS1(2T MARK) | 1 | 3 | 3 |
| Δ3 | \|A3-A0\| | dTS1(2T MARK) | 2 | 0 | 1 |
| Δ4 | \|A1-A2\| | dTS1(2T MARK) | 6 | 6 | 7 |
| Δ5 | \|B1-B0\| | dTS1(3T MARK) | 1 | 2 | 2 |
| Δ6 | \|E1-E0\| | dTS2(2T MARK) | 3 | 3 | 4 |
| Δ7 | \|E2-E0\| | dTS2(2T MARK) | 3 | 3 | 3 |
| Δ8 | \|E3-E0\| | dTS2(2T MARK) | 2 | 0 | 1 |
| Δ9 | \|E1-E2\| | dTS2(2T MARK) | 6 | 6 | 7 |
| Δ10 | \|F1-F0\| | dTS2(3T MARK) | 1 | 1 | 1 |
| Δ11 | \|I1-I0\| | dTE1(2T MARK) | 3 | 3 | 4 |
| Δ12 | \|I2-I0\| | dTE1(2T MARK) | 3 | 2 | 3 |
| Δ13 | \|I3-I0\| | dTE1(2T MARK) | 2 | 0 | 1 |
| Δ14 | \|I1-I2\| | dTE1(2T MARK) | 6 | 5 | 7 |
| Δ15 | \|J1-J0\| | dTE1(3T MARK) | 2 | 1 | 1 |
| Δ16 | \|P1-P0\| | dTE2(3T MARK) | 1 | 1 | 1 |

As shown in Table 10, when a recording pulse without the bottom power level (Pb) is used only in the first information layer 41, the variation amount of the control parameter for space compensation of the first information layer 41, which is the farthest from the incidence side of the laser light 31, can become larger than the variation amount of control parameter for space compensation of the third information layer 43 and the second information layer 42, which are close to the incidence side of the laser light 31.

As described hereinabove, with the optical information recording method of the above-mentioned embodiments and examples, marks are formed on the optical information recording medium by irradiation with a laser beam corresponding to a recording pulse sequence modulated between a plurality of power levels, and information is recorded by the edge positions of marks and paces between the marks. In this case, the optical information recording method includes a step of selecting control parameters of the recording pulse sequence for forming the marks on the basis of combinations of the mark length of a mark, the first space length of the first space immediately before the mark, and the second space length of the second space immediately after the mark, and a step of recording the marks by the recording pulse sequence based on the selected control parameter. The optical information recording medium is provided with N (N is an integer equal to or greater than 2) of information layers having recording layers in which changes in a physical state are induced by local temperature changes caused by convergence of the laser beam.

In this case, in the step of selecting the control parameters of the recording pulse sequence, the first space length is classified into m types (m is an integer), and the second space length is classified into n type (n is an integer). At least either of m and n is equal to or greater than 2. The control parameters include (m×n) control parameters each corresponding to a combination of the first space length and the second space length. In this case, the absolute value of a difference between two predetermined control parameters from among the (m×n) control parameters selected during recording on the second information layer located on the incidence side of the laser beam with respect to the predetermined first information layer from among the N information layers is equal to or greater than the absolute value of a difference between the two predetermined control parameters from among the (m×n) control parameters selected during recording on the first information layer.

For example, in the case of the edge variation amount dTS1 shown in FIG. 5, the front space length (first space length) is classified into two types, namely, "2T" and "equal to or greater than 3T". Thus, m=2. Further, the rear space length (second space length) is classified into two types, namely, "2T" and "equal to or greater than 3T". Thus, n=2. In this case, the control parameters include (m×n), that is, 2×2=4, control parameters corresponding to the combinations of the front space length and rear space length. Thus, the control parameters include four control parameters A0, A1, A2, and A3. In this case, the absolute value of a difference between two predetermined control parameters from among the (m×n) control parameters is an absolute value of a difference between two predetermined control parameters from among the four control parameters A0, A1, A2, and A3. The absolute value of a difference between two control parameters is, for example, Δ1=A1−A0|, Δ2=|A2−A0|, Δ3=|A3−A0|, or Δ4=A1−A2| shown in Table 9.

The absolute value of a difference between two predetermined control parameters selected during recording on the second information layer located on the incidence side of the laser beam with respect to the predetermined first information layer is equal to or greater than the absolute value of a difference between the two predetermined control parameters selected during recording on the first information layer. For example, as shown in Table 9, the absolute values Δ1, Δ2, Δ3, and Δ4 of a difference between the two predetermined control parameters selected during recording on the third information layer 43 are equal to or greater than the absolute values Δ1, Δ2, Δ3, and Δ4 of a difference between the two predetermined control parameters selected during recording on the second information layer 42.

With the above-described configuration, high-quality recording of information can be performed even when thermal conductivity of the information layer on this side is low. As a result, by decreasing the thickness of the metal layer of the information layer on this side, it is possible to realize a high transmittance and reproduce the information with high quality.

In the example shown in Table 9, the absolute values Δ1, Δ2, Δ3, and Δ4 of the difference between the control parameters of the third information layer 43 are equal to or greater than the absolute values Δ1, Δ2, Δ3, and Δ4 of the difference between the control parameters of the first information layer 41. Further, the absolute values Δ1, Δ2, Δ3, and Δ4 of the difference between the control parameters of the second information layer 42 are equal to or greater than the absolute values Δ1, Δ2, Δ3, and Δ4 of a difference between the control parameters of the first information layer 41. However, such relationships are not limiting.

As mentioned hereinabove, in the case such as shown in Table 10, the above-described effect can be obtained when the absolute values Δ1, Δ2, Δ3, and Δ4 of the difference between the control parameters of the third information layer 43 are equal to or greater than the absolute values Δ1, Δ2, Δ3, and Δ4 of the difference between the control parameters of the second information layer 42.

Thus, the absolute value of a difference between two predetermined control parameters from among (m×n) control parameters selected during recording on the second information layer may be equal to or greater than the absolute value of a difference between two predetermined control parameters from among (m×n) control parameters selected during recording on the first information layer in at least one combination of the first information layer, which is one information layer from among N information layers, and the second information layer, which is located on the incidence side of the laser beam with respect to the first information layer.

Further, in Table 9, even among the variation amounts of control parameters relating to the 2T marks, the values of Δ4, Δ9, and Δ14 are particularly large. This represents the difference between the case where the front space length of the front space of the 2T mark is 2T and the rear space length of the rear space of the 2T mark is equal to or greater than 3T and the space where the front space length of front space of the 2T mark is equal to or greater than 3T and the rear space length of the rear space of the 2T mark is 2T. In other words, the difference between the control parameters is the difference between the control parameters of components at diagonal position in the case where the conditions of the front space length and rear space length of control parameters corresponding to the 2T mark length are asymmetrical in Tables 5, 6 and 7. In other words, it is clear that changing significantly the control parameters is an effective means for inhibiting the degradation of recording characteristics caused by the effect of thermal interference.

Figure 11:
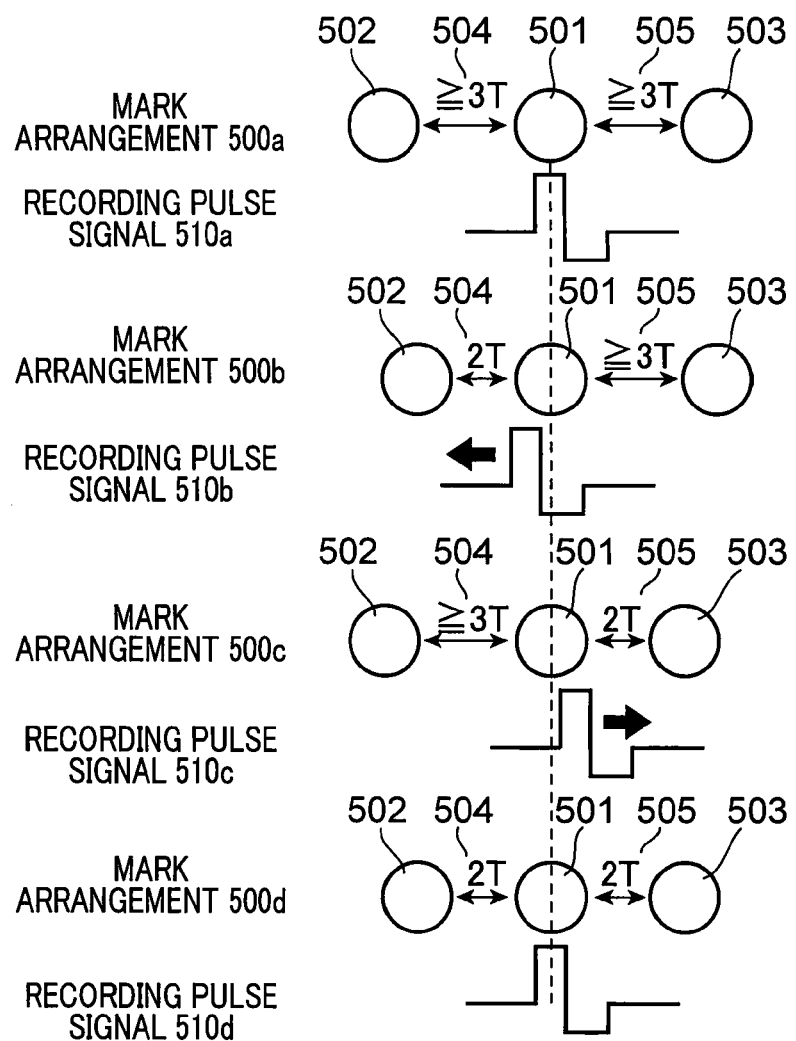
FIG. 11 illustrates an example of mark arrangement and recording pulse signal in the case of recording a 2T mark in the embodiment of the present invention.

The reasons for the above-described effect will be explained below with reference to FIG. 11. FIG. 11 illustrates an example of mark arrangement and the recording pulse signal in the case of recording the 2T mark in an embodiment of the present invention. In the representation shown in FIG. 11, the recording pulse for recording the 2T mark changes depending on the front space length and rear space length. In mark arrangements 500a to 500d in FIG. 11, the mark length (front mark length) of a mark 502 immediately before a 2T mark 501 which is to be recorded and the mark length (rear mark length) of a mark 502 immediately after the 2T mark 501 which is to be recorded are 2 t, but they may also equal to or greater than 3T. The effect obtained when the front mark length and the rear mark length are equal to or greater than 3T is similar to that described hereinbelow.

In the mark arrangement 500a shown in FIG. 11, both the space length (front space length) of a space (front space) 504 immediately before the 2T mark 501 and the space length (rear space length) of a space (rear space) 505 immediately after the 2T mark 501 are equal to or greater than 3T. Further, a recording pulse signal 510a shown in FIG. 11 is obtained when forming the recording marks shown in the mark arrangement 500a. In this case, the effect of thermal interference is small.

In the mark arrangement 500b shown in FIG. 11, the space length (front space length) of the space (front space) 504 immediately before the 2T mark 501 is 2T, and the space length (rear space length) of the space (rear space) 505 immediately after the 2T mark 501 is equal to or greater than 3T. Further, a recording pulse signal 510b shown in FIG. 11 is obtained when forming the recording marks shown in the mark arrangement 500b. In this case, thermal interference from the front mark 502 increases and the pulse edge of the recording pulse signal 510b changes. In the example shown herein, the recording pulse signal 510b is changed so as to be entirely on the front side.

In the mark arrangement 500c shown in FIG. 11, the space length (front space length) of the space (front space) 504 immediately before the 2T mark 501 is equal to or greater than 3T, and the space length (rear space length) of the space (rear space) 505 immediately after the 2T mark 501 is 2T. Further, a recording pulse signal 510c shown in FIG. 11 is obtained when forming the recording marks shown in the mark arrangement 500c. In this case, thermal interference from the rear mark 503 increases and the pulse edge of the recording pulse signal 510c changes. In the example shown herein, the recording pulse signal 510c is changed so as to be entirely on the rear side under the action in the direction opposite that of the action from the front mark 502 shown in the recording pulse signal 510b in FIG. 11.

In the mark arrangement 500d shown in FIG. 11, both the space length (front space length) of the space (front space) 504 immediately before the 2T mark 501 and the space length (rear space length) of the space (rear space) 505 immediately after the 2T mark 501 are 2T. Further, a recording pulse signal 510d shown in FIG. 11 is obtained when forming the recording marks shown in the mark arrangement 500d. In this case, thermal interference from the front mark 502 and the rear mark 503 increases. The action from the front mark 502 and the action from the rear mark 503 cancel each other. As a result, the recording pulse signal 510d assumes a pulse waveform close to that of the pulse edge of the recording pulse signal 510a shown in FIG. 11.

Thus, the difference between the control parameter in the case where the front space length is 2T and the rear space length is equal to or greater than 3T and the control parameter in the case where the front space length is equal to or greater than 3T and the rear space length is 2T becomes the largest.

In other words, where the variation amount to the control parameter of such space compensation is set, thin-film setting can be used such that makes it possible to obtain good recording performance and reproduction performance in an optical information recording medium having two or more recording layers where high-density recording is performed.

As described hereinabove, with the configuration of the above-described embodiments and examples, when the shortest mark length and the shortest space length are, for example, 2T in the step of selecting the control parameters of the recording pulse sequence, the front space of the space immediately before the mark may be classified into at least two types, namely, 2T and equal to or greater than 3T. Further, the rear space length of the space immediately after the mark may be classified into at least two types, namely, 2T and equal to or greater than 3T. In this case, when the control parameter of the recording pulse sequence in the case where the front space length is 2T and the rear space length is greater than 2T is taken as the first control parameter and the control parameter of the recording pulse sequence in the case where the front space length is greater than 2T and the rear space length is 2T is taken as the second control parameter, the absolute value of the difference between the first control parameter and the second control parameter selected during recording on the second information layer that is on the incidence side of the laser beam with respect to the predetermined first information layer is larger than the absolute value of the difference between the first control parameter and the second control parameter selected during recording on the first information layer.

Thus, in the step of selecting the control parameters of the recording pulse sequence, when a shortest space length is denoted by k, the first space length is classified into at least two types, namely, k and k+1 or greater, and the second space length is classified into at least two types, namely, k and k+1 or greater. When the control parameter of the recording pulse sequence in the case where the first space length is k and the second space length is greater than k is taken as the first control parameter and the control parameter of the recording pulse sequence in the case where the first space length is greater than k and the second space length is k is taken as the second control parameter, the absolute value of the difference between the first control parameter and the second control parameter selected during recording on the second information layer is greater than the absolute value of the difference between the first control parameter and the second control parameter selected during recording on the first information layer.

The first control parameters are, for example, "A1", "E1", and "I1" in the above-described Table 5, Table 6, and Table 7. The second control parameters are, for example, "A2", "E2", and "I2" in the above-described Table 5, Table 6, and Table 7. Therefore, the absolute value of the difference between the above-mentioned first control parameters and the second control parameters is, for example, "$\Delta 4=|A1-A2|$", "$\Delta 9=|E1-E2|$", and "$\Delta 14=|I1-I2|$" in Table 9.

For example, as shown in Table 9, the absolute values $\Delta 4$, $\Delta 9$, and $\Delta 4$ of the difference between the control parameters in the third information layer are larger than respective absolute values $\Delta 4$, $\Delta 9$, and $\Delta 14$ of the difference between the control parameters in the second information layer.

With the above-described configuration, the degradation of recording characteristics caused by the effect of thermal interference can be inhibited. Thus, high-quality information recording can be performed even in the case where thermal conductivity of the information layer is low. In other words, where the variation amount to the control parameter of such space compensation is set, thin-film setting is possible such that makes it possible to obtain good recording performance and reproduction performance in an optical information recording medium having two or more recording layers where high-density recording is performed. As a result, the metal layer of the information layer can be reduced in thickness, thereby making it possible to realize a high transmittance and reproduce information with high quality.

In the example shown in Table 9, the absolute values $\Delta 4$, $\Delta 9$, and $\Delta 14$ of the difference between the control parameters in the third information layer are larger than the respective absolute values $\Delta 4$, $\Delta 9$, and $\Delta 14$ of the difference between the control parameters in the first information layer. The absolute values $\Delta 4$, $\Delta 9$, and $\Delta 14$ of the difference between the control parameters in the second information layer are also larger than the respective absolute values $\Delta 4$, $\Delta 9$, and $\Delta 14$ of the difference between the control parameters in the first information layer. However, these relationships are not limiting.

As mentioned hereinabove, in the case such as shown in Table 10, the above-described effect can be obtained when the absolute values $\Delta 4$, $\Delta 9$, and $\Delta 14$ of the difference between the control parameters of the third information layer are greater than the absolute values $\Delta 4$, $\Delta 9$, and $\Delta 14$ of the difference between the control parameters of the second information layer.

Thus, the absolute value of the difference between the first control parameters and the second control parameters selected during recording on the second information layer may be greater than the absolute value of the difference between the first control parameters and the second control parameters selected during recording on the first information layer in at least one combination of the predetermined first information layer from among N information layers and the second information layer, which is located on the incidence side of the laser beam with respect to the first information layer.

The materials and film thicknesses presented in the abovementioned embodiments and examples are merely examples of various materials and film thicknesses for implementing the present invention, and the present invention is not limited thereto. The optical information recording medium in accordance with the present invention may use materials other than those presented in the abovementioned embodiments and examples and may be set to thicknesses other than the thicknesses of the layers presented in the abovementioned embodiments and examples.

Further, the features described in the abovementioned embodiments and examples may be used in optical recording and reproduction devices using a SIL (solid immersion lens). Further, the features described in the abovementioned embodiments and examples may be used in optical recording and reproduction devices based on near-field recording using a plasmon resonance.

The above-described specific embodiment mainly includes the invention having the below-described features.

The one aspect of the present invention resides in an optical information recording method by which marks are formed by irradiation with a laser beam corresponding to a recording pulse sequence modulated between a plurality of power levels and information is recorded based on edge positions of the marks and spaces between the marks, on an optical information recording medium provided with N (N is an integer equal to or greater than 2) information layers each having a recording layer in which variations in a physical state are caused by local temperature variations caused by convergence of a laser beam, the optical information recording method including: a step of selecting control parameters of the recording pulse sequence for forming the marks on the basis of combinations of a mark length of the mark, a first space length of a first space immediately before the mark, and a second space length of a second space immediately after the mark; and a step of recording the marks by the recording pulse sequence determined by the selected control parameters, wherein in the step of selecting control parameters of the recording pulse sequence, the first space length is classified into m types (m is an integer), and the second space length is classified into n types (n is an integer), at least either of the m and the n being equal to or greater than 2; the control parameters include (m×n) control parameters each corresponding to a combination of the first space length and the second space length; and an absolute value of a difference between two predetermined control parameters from among the (m×n) control parameters selected during recording on a second information layer located on an incidence side of the laser beam with respect to a predetermined first information layer from among the N information layers is equal to or greater than an absolute value of a difference between two predetermined control parameters from among the (m×n) control parameters selected during recording on the first information layer.

With such a configuration, control parameters of the recording pulse sequence for forming the marks are selected on the basis of combinations of the mark length of a mark, the first space length of the first space immediately before the mark, and the second space length of the second space immediately after the mark. The marks are recorded by the recording pulse sequence determined by the selected control parameters. When the control parameters of the recording pulse sequence are selected, the first space length is classified into m types (m is an integer) and the second space length is classified into n types (n is an integer). At least either of the m and the n is equal to or greater than 2. The control parameters include (m×n) control parameters each corresponding to a combination of the first space length and the second space length. An absolute value of a difference between two predetermined control parameters from among the (m×n) control parameters selected during recording on a second information layer located on an incidence side of the laser beam with respect to a predetermined first information layer from among the N information layers is equal to or greater than an absolute value of a difference between two predetermined control parameters from among the (m×n) control parameters selected during recording on the first information layer.

Therefore, the variation amount of the control parameters of the recording pulse sequence that is selected during recording on the second information layer located on an incidence side of the laser beam with respect to the predetermined first information layer from among N information layers increases. Therefore, high-quality recording of information can be performed even when the information layer on the incidence side of the laser beam has a low thermal conductivity. As a result, a high transmittance can be realized by reducing the thickness of the metal layer of the information layer on the incidence side of the laser beam, and information can be recorded and reproduced with high quality in all of the information layers of the optical information recording medium.

In the above-described optical information recording method, it is preferred that in the step of selecting control parameters of the recording pulse sequence, when a shortest space length is denoted by k, the first space length be classified into at least two types, namely, k and k+1 or greater, and the second space length be classified into at least two types, namely, k and k+1 or greater; when the control parameter of the recording pulse sequence in the case in which the first space length is k and the second space length is greater than k is taken as a first control parameter, and when the control parameter of the recording pulse sequence in the case in which the first space length is greater than k and the second space length is k is taken as a second control parameter, an absolute value of a difference between the first control parameter and the second control parameter selected during recording on the second information layer be greater than an absolute value of a difference between the first control parameter and the second control parameter selected during recording on the first information layer.

With such a configuration, when control parameters of the recording pulse sequence are selected and when a shortest space length is denoted by k, the first space length is classified into at least two types, namely, k and k+1 or greater, and the second space length is classified into at least two types, namely, k and k+1 or greater. When the control parameter of the recording pulse sequence in the case in which the first space length is k and the second space length is greater than k is taken as a first control parameter, and when the control parameter of the recording pulse sequence in the case in which the first space length is greater than k and the second space length is k is taken as a second control parameter, an absolute value of a difference between the first control parameter and the second control parameter selected during recording on the second information layer is greater than an absolute value of a difference between the first control parameter and the second control parameter selected during recording on the first information layer.

Therefore, degradation of recording characteristics caused by a thermal interference effect can be inhibited, and high-quality recording of information can be performed even when the information layer on the incidence side of the laser beam has a low thermal conductivity.

In the above-described optical information recording method, it is preferred that the control parameter be at least one from among a position of a pulse edge of a leading end of the recording pulse sequence, a position of a second pulse edge from the leading end of the recording pulse sequence, a position of a pulse edge of a trailing end of the recording pulse sequence, and a position of a second pulse edge from the trailing end of the recording pulse sequence.

With such a configuration, the leading end position of the mark can be accurately controlled by changing at least one from among a position of a pulse edge of a leading end of the recording pulse sequence, a position of a second pulse edge from the leading end of the recording pulse sequence, a position of a pulse edge of a trailing end of the recording pulse sequence, and a position of a second pulse edge from the trailing end of the recording pulse sequence.

Further, in the above-described optical information recording method, it is preferred that the recording pulse sequence be modulated by switching an intensity of the laser beam between three or more values of power. With such a configuration, the recording pulse sequence can be modulated by three or more levels of power.

Further, in the above-described optical information recording method, it is preferred that in the step of selecting control parameters of the recording pulse sequence, when a shortest mark length is denoted by k, the mark length be classified into at least two types, namely, k and k+1 or greater.

With such a configuration, when the control parameters of the recording pulse sequence are selected and when the shortest mark length is denoted by k, the mark length is classified into at least two types, namely, k and k+1 or greater. Therefore, control parameters corresponding to mark lengths of at least two types can be selected.

Further, in the above-described optical information recording method, it is preferred that in the step of selecting control parameters of the recording pulse sequence, when a shortest mark length is denoted by k, the mark length be classified into at least three types, namely, k, k+1, and k+2 or greater.

With such a configuration, when the control parameters of the recording pulse sequence are selected, and when the shortest mark length is denoted by k, the mark length is classified into at least three types, namely, k, k+1, and k+2 or greater. Therefore, control parameters corresponding to mark lengths of at least three types can be selected.

Further, in the above-described optical information recording method, it is preferred that in the step of selecting control parameters of the recording pulse sequence, when a shortest mark length is denoted by k, the mark length be classified into at least four types, namely, k, k+1, k+2, and k+3 or greater.

With such a configuration, when the control parameters of the recording pulse sequence are selected, and when the shortest mark length is denoted by k, the mark length is classified into at least four types, namely, k, k+1, k+2, and k+3 or greater. Therefore, control parameters corresponding to mark lengths of at least four types can be selected.

Further, in the above-described optical information recording method, it is preferred that in the step of selecting control parameters of the recording pulse sequence, when a shortest mark length is denoted by k, the first space length and the second space length be each classified into at least two types, namely, k and k+1 or greater.

With such a configuration, when the control parameters of the recording pulse sequence are selected, and when the shortest mark length is denoted by k, the first space length and the second space length are each classified into at least two types, namely, k and k+1 or greater. Therefore, control parameters corresponding to the first space length and the second space length of at least two types can be selected.

Further, in the above-described optical information recording method, it is preferred that in the step of selecting control parameters of the recording pulse sequence, when a shortest mark length is denoted by k, the first space length and the second space length be each classified into at least four types, namely, k, k+1, k+2, and k+3 or greater.

With such a configuration, when the control parameters of the recording pulse sequence are selected, and when the shortest mark length is denoted by k, the first space length and the second space length are each classified into at least four types, namely, k, k+1, k+2, and k+3 or greater. Therefore, control parameters corresponding to the first space length and the second space length of at least four types can be selected.

Further, in the above-described optical information recording method, it is preferred that in the step of selecting control parameters of the recording pulse sequence, the recording pulse sequence be controlled by referring to a recording compensation table in which the combinations of the mark length, the first space length, and the second space length are associated with the control parameters.

With such a configuration, when the control parameters of the recording pulse sequence are selected, the recording pulse sequence is controlled by referring to a recording compensation table in which the combinations of the mark length, the first space length, and the second space length are associated with the control parameters. Therefore, the control parameters can be easily selected.

Further, it is preferred that the above-described optical information recording method further include: a step of classifying the marks on the basis of combinations of the mark length, the first space length, and the second space length and performing test writing of the classified marks; a step of obtaining a reproduction signal by reproducing the test-written marks and spaces; and a step of creating a recording compensation table in which the combinations of the mark length, the first space length, and the second space length are associated with the control parameters.

With such a configuration, the marks are classified on the basis of combinations of the mark length, the first space length, and the second space length and the classified marks are test written. The test-written marks and spaces are reproduced and the reproduction signal is obtained. A recording compensation table is created in which the combinations of the mark length, the first space length, and the second space length are associated with the control parameters on the basis of the reproduction signal.

Therefore, since the recording compensation table is created by the test writing of the marks, the control parameters adapted to the optical information recording medium can be set.

Another aspect of the present invention resides in an optical information recording device in which marks are formed by irradiation with a laser beam corresponding to a recording pulse sequence modulated between a plurality of power levels and information is recorded based on edge positions of the marks and spaces between the marks, on an optical information recording medium provided with N (N is an integer equal to or greater than 2) information layers each having a recording layer in which variations in a physical state are caused by local temperature variations caused by convergence of a laser beam, the optical information recording device including: a selection unit that selects control parameters of the recording pulse sequence for forming the marks on the basis of combinations of a mark length of the mark, a first space length of a first space immediately before the mark, and a second space length of a second space immediately after the mark; and a recording unit that records the marks by the recording pulse sequence determined by the selected control parameters, wherein the selection unit classifies the first space length into m types (m is an integer) and classifies the second space length into n types (n is an integer), at least either of the m and the n being equal to or greater than 2; the control parameters include (m×n) control parameters each corresponding to a combination of the first space length and the second space length; and an absolute value of a difference between two predetermined control parameters from among the (m×n) control parameters selected during recording on a second information layer located on an incidence side of the laser beam with respect to a predetermined first information layer from among the N information layers is equal to or greater than an absolute value of a difference between two predetermined control parameters from among the (m×n) control parameters selected during recording on the first information layer.

With such a configuration, control parameters of the recording pulse sequence for forming the marks are selected on the basis of combinations of the mark length of a mark, the first space length of the first space immediately before the mark, and the second space length of the second space immediately after the mark. The marks are recorded by the recording pulse sequence determined by the selected control parameters. When the control parameters of the recording pulse sequence are selected, the first space length is classified into m types (m is an integer) and the second space length is classified into n types (n is an integer). At least either of the m and the n is equal to or greater than 2. The control parameters include (m×n) control parameters each corresponding to a combination of the first space length and the second space length. An absolute value of a difference between two predetermined control parameters from among the (m×n) control parameters selected during recording on a second information layer located on an incidence side of the laser beam with respect to a predetermined first information layer from among the N information layers is equal to or greater than an absolute value of a difference between two predetermined control parameters from among the (m×n) control parameters selected during recording on the first information layer.

Therefore, the variation amount of the control parameters of the recording pulse sequence that is selected during recording on the second information layer located on an incidence side of the laser beam with respect to the predetermined first information layer from among N information layers increases. Therefore, high-quality recording of information can be performed even when the information layer on the incidence side of the laser beam has a low thermal conductivity. As a result, a high transmittance can be realized by reducing the thickness of the metal layer of the information layer on the incidence side of the laser beam, and information can be recorded and reproduced with high quality in all of the information layers of the optical information recording medium.

Further, in the above-described optical information recording device, it is preferred that when a shortest space length is denoted by k, the selection unit classify the first space length into at least two types, namely, k and k+1 or greater, and classifies the second space length into at least two types, namely, k and k+1 or greater; when the control parameter of the recording pulse sequence in the case in which the first space length is k and the second space length is greater than k is taken as a first control parameter, and when the control parameter of the recording pulse sequence in the case in which the first space length is greater than k and the second space length is k is taken as a second control parameter, an absolute value of a difference between the first control parameter and the second control parameter selected during recording on the second information layer be greater than an absolute value of a difference between the first control parameter and the second control parameter selected during recording on the first information layer.

With such a configuration, when control parameters of the recording pulse sequence are selected and when a shortest space length is denoted by k, the first space length is classified into at least two types, namely, k and k+1 or greater, and the second space length is classified into at least two types, namely, k and k+1 or greater. When the control parameter of the recording pulse sequence in the case in which the first space length is k and the second space length is greater than k is taken as a first control parameter, and when the control parameter of the recording pulse sequence in the case in which the first space length is greater than k and the second space length is k is taken as a second control parameter, an absolute value of a difference between the first control parameter and the second control parameter selected during recording on the second information layer is greater than an absolute value of a difference between the first control parameter and the second control parameter selected during recording on the first information layer.

Therefore, degradation of recording characteristics caused by a thermal interference effect can be inhibited, and high-quality recording of information can be performed even when the information layer on the incidence side of the laser beam has a low thermal conductivity.

Another aspect of the present invention resides in an optical information reproduction method reproducing information from an optical information recording medium on which the marks have been recorded by any one of the above-described optical information recording methods, the optical information reproduction method including: a step of reproducing the information by irradiating the optical information recording medium with a laser beam.

With such a configuration, information is reproduced from an optical information recording medium on which the marks have been recorded by any one of the above-described optical information recording methods. Therefore, information can be reproduced with high quality from all of the information layers of the optical information recording medium.

Another aspect of the present invention resides in an optical information reproduction device that reproduces information from an optical information recording medium on which the marks have been recorded by any one of the above-described optical information recording methods, the optical information reproduction device including: a reproduction unit that reproduces the information by irradiating the optical information recording medium with a laser beam.

With such a configuration, information is reproduced from an optical information recording medium on which the marks have been recorded by any one of the above-described optical information recording methods. Therefore, information can be reproduced with high quality from all of the information layers of the optical information recording medium.

Another aspect of the present invention resides in an optical information recording medium on which marks are formed by irradiation with a laser beam corresponding to a recording pulse sequence modulated between a plurality of power levels and information is recorded based on edge positions of the marks and spaces between the marks, the optical information recording medium including: N (N is an integer equal to or greater than 2) information layers each having a recording layer in which variations in a physical state are caused by local temperature variations caused by convergence of a laser beam, wherein control parameters of the recording pulse sequence for forming the marks are selected on the basis of combinations of a mark length of the mark, a first space length of a first space immediately before the mark, and a second space length of a second space immediately after the mark; the marks are recorded by the recording pulse sequence determined by the selected control parameters; when control parameters of the recording pulse sequence are selected, the first space length is classified into m types (m is an integer), and the second space length is classified into n types (n is an integer), at least either of the m and the n being equal to or greater than 2; the control parameters include (m×n) control parameters each corresponding to a combination of the first space length and the second space length; and an absolute value of a difference between two predetermined control parameters from among the (m×n) control parameters selected during recording on a second information layer located on an incidence side of the laser beam with respect to a predetermined first information layer from among the N information layers is equal to or greater than an absolute value of a difference between two predetermined control parameters from among the (m×n) control parameters selected during recording on the first information layer.

With such a configuration, control parameters of the recording pulse sequence for forming the marks are selected on the basis of combinations of the mark length of a mark, the first space length of the first space immediately before the mark, and the second space length of the second space immediately after the mark. The marks are recorded by the recording pulse sequence determined by the selected control parameters. When the control parameters of the recording pulse sequence are selected, the first space length is classified into m types (m is an integer) and the second space length is classified into n types (n is an integer). At least either of the m and the n is equal to or greater than 2. The control parameters include (m×n) control parameters each corresponding to a combination of the first space length and the second space length. An absolute value of a difference between two predetermined control parameters from among the (m×n) control parameters selected during recording on a second information layer located on an incidence side of the laser beam with respect to a predetermined first information layer from among the N information layers is equal to or greater than an absolute value of a difference between two predetermined control parameters from among the (m×n) control parameters selected during recording on the first information layer.

Therefore, the variation amount of the control parameters of the recording pulse sequence that is selected during recording on the second information layer located on an incidence side of the laser beam with respect to the predetermined first information layer from among N information layers increases. Therefore, high-quality recording of information can be performed even when the information layer on the incidence side of the laser beam has a low thermal conductivity. As a result, a high transmittance can be realized by reducing the thickness of the metal layer of the information layer on the incidence side of the laser beam, and information can be recorded and reproduced with high quality in all of the information layers of the optical information recording medium.

In the above-described optical information recording medium, it is preferred that when control parameters of the recording pulse sequence are selected and when a shortest space length is denoted by k, the first space length be classified into at least two types, namely, k and k+1 or greater, and the second space length be classified into at least two types, namely, k and k+1 or greater; when the control parameter of the recording pulse sequence in the case in which the first space length is k and the second space length is greater than k is taken as a first control parameter, and when the control parameter of the recording pulse sequence in the case in which the first space length is greater than k and the second space length is k is taken as a second control parameter, an absolute value of a difference between the first control parameter and the second control parameter selected during recording on the second information layer be greater than an absolute value of a difference between the first control parameter and the second control parameter selected during recording on the first information layer.

With such a configuration, when control parameters of the recording pulse sequence are selected and when a shortest space length is denoted by k, the first space length is classified into at least two types, namely, k and k+1 or greater, and the second space length is classified into at least two types, namely, k and k+1 or greater. When the control parameter of the recording pulse sequence in the case in which the first space length is k and the second space length is greater than k is taken as a first control parameter, and when the control parameter of the recording pulse sequence in the case in which the first space length is greater than k and the second space length is k is taken as a second control parameter, an absolute value of a difference between the first control parameter and the second control parameter selected during recording on the second information layer is greater than an absolute value of a difference between the first control parameter and the second control parameter selected during recording on the first information layer.

Therefore, degradation of recording characteristics caused by a thermal interference effect can be inhibited, and high-quality recording of information can be performed even when the information layer on the incidence side of the laser beam has a low thermal conductivity.

Specific embodiments or examples described in the section relating to the Description of Embodiments merely clarify the technical contents of the present invention, and the present invention should not be construed narrowly as being limited by those specific examples. Thus, various changes can be made without departing from the essence and scope of the claims of the present invention.

INDUSTRIAL APPLICABILITY

The optical information recording method, optical information recording device, optical information reproduction method, optical information reproduction device, and optical information recording medium in accordance with the present invention can record and reproduce information with high quality on and from all of the information layers of the optical information recording medium and are suitable for optical information recording methods and optical information recording devices using laser beam irradiation to record information on an optical information recording medium, optical information reproduction methods and optical information reproduction devices using laser beam irradiation to reproduce information from an optical information recording medium, and optical information recording media provided with two or more information layers.

The invention claimed is:

1. An optical information recording method by which marks are formed by irradiation with a laser beam corresponding to a recording pulse sequence modulated between a plurality of power levels and information is recorded based on edge positions of the marks and spaces between the marks, on an optical information recording medium provided with N (N is an integer equal to or greater than 2) information layers each having a recording layer in which variations in a physical state are caused by local temperature variations caused by convergence of a laser beam, the optical information recording method comprising:

a step of selecting control parameters of the recording pulse sequence for forming the marks on the basis of combinations of a mark length of the mark, a first space length of a first space immediately before the mark, and a second space length of a second space immediately after the mark; and a step of recording the marks by the recording pulse sequence determined by the selected control parameters, wherein in the step of selecting control parameters of the recording pulse sequence, the first space length is classified into m types (m is an integer), and the second space length is classified into n types (n is an integer), at least either of the m and the n being equal to or greater than 2;

the control parameters include (m×n) control parameters each corresponding to a combination of the first space length and the second space length; and an absolute value of a difference between two predetermined control parameters from among the (m×n) control parameters selected during recording on a second information layer located on an incidence side of the laser beam with respect to a predetermined first information layer from among the N information layers is equal to or greater than an absolute value of a difference between two predetermined control parameters from among the (m×n) control parameters selected during recording on the first information layer.

2. The optical information recording method according to claim 1, wherein in the step of selecting control parameters of the recording pulse sequence, when a shortest space length is denoted by k, the first space length is classified into at least two types, namely, k and k+1 or greater, and the second space length is classified into at least two types, namely, k and k+1 or greater;

when a control parameter of the recording pulse sequence in the case in which the first space length is k and the second space length is greater than k is taken as a first control parameter, and when the control parameter of the recording pulse sequence in the case in which the first space length is greater than k and the second space length is k is taken as a second control parameter, an absolute value of a difference between the first control parameter and the second control parameter selected during recording on the second information layer is greater than an absolute value of a difference between the first control parameter and the second control parameter selected during recording on the first information layer.

3. The optical information recording method according to claim 1, wherein a control parameter is at least one from among a position of a pulse edge of a leading end of the recording pulse sequence, a position of a second pulse edge from the leading end of the recording pulse sequence, a position of a pulse edge of a trailing end of the recording pulse sequence, and a position of a second pulse edge from the trailing end of the recording pulse sequence.

4. The optical information recording method according to claim 1, wherein the recording pulse sequence is modulated by switching an intensity of the laser beam between three or more values of power.

5. The optical information recording method according to claim 1, wherein in the step of selecting control parameters of the recording pulse sequence, when a shortest mark length is denoted by k, the mark length is classified into at least two types, namely, k and k+1 or greater.

6. The optical information recording method according to claim 1, wherein in the step of selecting control parameters of the recording pulse sequence, when a shortest mark length is denoted by k, the mark length is classified into at least three types, namely, k, k+1, and k+2 or greater.

7. The optical information recording method according to claim 1, wherein in the step of selecting control parameters of the recording pulse sequence, when a shortest mark length is denoted by k, the mark length is classified into at least four types, namely, k, k+1, k+2, and k+3 or greater.

8. The optical information recording method according to claim 1, wherein in the step of selecting control parameters of the recording pulse sequence, when a shortest mark length is denoted by k, the first space length and the second space length are each classified into at least two types, namely, k and k+1 or greater.

9. The optical information recording method according to claim 1, wherein in the step of selecting control parameters of the recording pulse sequence, when a shortest mark length is denoted by k, the first space length and the second space length are each classified into at least four types, namely, k, k+1, k+2, and k+3 or greater.

10. The optical information recording method according to claim 1, wherein in the step of selecting control parameters of the recording pulse sequence, the recording pulse sequence is controlled by referring to a recording compensation table in which the combinations of the mark length, the first space length, and the second space length are associated with the control parameters.

11. The optical information recording method according to claim 1, further comprising:
a step of classifying the marks on the basis of combinations of the mark length, the first space length, and the second space length and performing test writing of the classified marks;
a step of obtaining a reproduction signal by reproducing the test-written marks and spaces; and
a step of creating a recording compensation table in which the combinations of the mark length, the first space length, and the second space length are associated with the control parameters on the basis of the reproduction signal.

12. An optical information recording device in which marks are formed by irradiation with a laser beam corresponding to a recording pulse sequence modulated between a plurality of power levels and information is recorded based on edge positions of the marks and spaces between the marks, on an optical information recording medium provided with N (N is an integer equal to or greater than 2) information layers each having a recording layer in which variations in a physical state are caused by local temperature variations caused by convergence of a laser beam, the optical information recording device comprising:
a selection unit that selects control parameters of the recording pulse sequence for forming the marks on the basis of combinations of a mark length of the mark, a first space length of a first space immediately before the mark, and a second space length of a second space immediately after the mark; and
a recording unit that records the marks by the recording pulse sequence determined by the selected control parameters, wherein
the selection unit classifies the first space length into m types (m is an integer) and classifies the second space length into n types (n is an integer), at least either of the m and the n being equal to or greater than 2;
the control parameters include (m×n) control parameters each corresponding to a combination of the first space length and the second space length; and
an absolute value of a difference between two predetermined control parameters from among the (m×n) control parameters selected during recording on a second information layer located on an incidence side of the laser beam with respect to a predetermined first information layer from among the N information layers is equal to or greater than an absolute value of a difference between two predetermined control parameters from among the (m×n) control parameters selected during recording on the first information layer.

13. The optical information recording device according to claim 12, wherein
when a shortest space length is denoted by k, the selection unit classifies the first space length into at least two types, namely, k and k+1 or greater, and classifies the second space length into at least two types, namely, k and k+1 or greater;
when a control parameter of the recording pulse sequence in the case in which the first space length is k and the second space length is greater than k is taken as a first control parameter, and when a control parameter of the recording pulse sequence in the case in which the first space length is greater than k and the second space length is k is taken as a second control parameter,
an absolute value of a difference between the first control parameter and the second control parameter selected during recording on the second information layer is greater than an absolute value of a difference between the first control parameter and the second control parameter selected during recording on the first information layer.

14. An optical information recording medium on which marks are formed by irradiation with a laser beam corresponding to a recording pulse sequence modulated between a plurality of power levels and information is recorded based on edge positions of the marks and spaces between the marks, the optical information recording medium comprising:
N (N is an integer equal to or greater than 2) information layers each having a recording layer in which variations in a physical state are caused by local temperature variations caused by convergence of a laser beam, wherein control parameters of the recording pulse sequence for forming the marks are selected on the basis of combinations of a mark length of the mark, a first space length of a first space immediately before the mark, and a second space length of a second space immediately after the mark;

the marks are recorded by the recording pulse sequence determined by the selected control parameters;

when control parameters of the recording pulse sequence are selected, the first space length is classified into m types (m is an integer), and the second space length is classified into n types (n is an integer), at least either of the m and the n being equal to or greater than 2;

the control parameters include (m×n) control parameters each corresponding to a combination of the first space length and the second space length; and an absolute value of a difference between two predetermined control parameters from among the (m×n) control parameters selected during recording on a second information layer located on an incidence side of the laser beam with respect to a predetermined first information layer from among the N information layers is equal to or greater than an absolute value of a difference between two predetermined control parameters from among the (m×n) control parameters selected during recording on the first information layer.

15. The optical information recording medium according to claim 14, wherein when control parameters of the recording pulse sequence are selected and when a shortest space length is denoted by k, the first space length is classified into at least two types, namely, k and k+1 or greater, and the second space length is classified into at least two types, namely, k and k+1 or greater;

when a control parameter of the recording pulse sequence in the case in which the first space length is k and the second space length is greater than k is taken as a first control parameter, and when a control parameter of the recording pulse sequence in the case in which the first space length is greater than k and the second space length is k is taken as a second control parameter, an absolute value of a difference between the first control parameter and the second control parameter selected during recording on the second information layer is greater than an absolute value of a difference between the first control parameter and the second control parameter selected during recording on the first information layer.

* * * * *